(12) United States Patent
Gahm et al.

(10) Patent No.: US 7,886,073 B2
(45) Date of Patent: Feb. 8, 2011

(54) SYSTEMS AND METHODS OF REDUCING MEDIA STREAM DELAY

(75) Inventors: Joshua B. Gahm, Newtonville, MA (US); Kapil Sharma, Acton, MA (US); Carol Etta Iturralde, Framington, MA (US); John Robert Pickens, Newark, CA (US); William C. Ver Steeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 208 days.

(21) Appl. No.: 12/188,718

(22) Filed: Aug. 8, 2008

(65) Prior Publication Data

US 2010/0036962 A1    Feb. 11, 2010

(51) Int. Cl.
G06F 15/16    (2006.01)
(52) U.S. Cl. .................. 709/231; 709/232; 709/233; 370/231; 370/232; 370/233; 370/234; 370/235
(58) Field of Classification Search ......... 709/231–233; 370/231–235
See application file for complete search history.

(56) References Cited

U.S. PATENT DOCUMENTS

| | | | |
|---|---|---|---|
| 5,594,509 A | 1/1997 | Florin et al. | |
| 5,633,683 A | 5/1997 | Rosengren et al. | |
| 5,790,546 A | 8/1998 | Dobbins et al. | |
| 5,913,031 A | 6/1999 | Blanchard | |
| 5,949,795 A | 9/1999 | Moroney et al. | |
| 6,118,498 A | 9/2000 | Reitmeier | |
| 6,252,849 B1 | 6/2001 | Rom et al. | |
| 6,453,471 B1 | 9/2002 | Klosterman | |
| 6,529,475 B1 * | 3/2003 | Wan et al. | 370/231 |
| 6,990,074 B2 * | 1/2006 | Wan et al. | 370/235 |
| 7,058,015 B1 * | 6/2006 | Wetherall et al. | 370/236 |
| 7,065,779 B1 | 6/2006 | Crocker et al. | |
| 7,113,484 B1 | 9/2006 | Chapman et al. | |
| 7,174,661 B2 * | 2/2007 | Briscoe | 37/455 |
| 7,333,434 B2 * | 2/2008 | Grenot et al. | 370/235 |
| 7,356,605 B1 * | 4/2008 | Khouri et al. | 709/232 |
| 7,477,653 B2 * | 1/2009 | Smith et al. | 370/432 |
| 7,496,676 B2 * | 2/2009 | Kryeziu | 709/231 |
| 2001/0025378 A1 | 9/2001 | Sakamoto et al. | |
| 2002/0019853 A1 | 2/2002 | Vange et al. | |

(Continued)

FOREIGN PATENT DOCUMENTS

EP    0 714 192    5/1996

(Continued)

OTHER PUBLICATIONS

Oran; U.S. Appl. No. 11/674,093, filed Feb. 12, 2007.

(Continued)

*Primary Examiner*—Krisna Lim
(74) *Attorney, Agent, or Firm*—Merchant & Gould

(57) ABSTRACT

In one embodiment, a method includes requesting accelerated delivery of a specified media stream. The media stream contains a plurality of video frames. The method also includes receiving a response to the accelerated delivery request and selecting, based on the response, a source media stream. The method also includes receiving the source media stream into a buffer and decoding the received media stream from the buffer, at a selected playout rate.

20 Claims, 19 Drawing Sheets

U.S. PATENT DOCUMENTS

| | | |
|---|---|---|
| 2002/0181454 A1 | 12/2002 | Norman et al. |
| 2002/0199203 A1 | 12/2002 | Duffy et al. |
| 2003/0067872 A1 | 4/2003 | Harrell et al. ............... 370/229 |
| 2003/0159143 A1 | 8/2003 | Chan |
| 2003/0196211 A1 | 10/2003 | Chan |
| 2003/0198184 A1* | 10/2003 | Huang et al. ................ 370/231 |
| 2004/0133907 A1 | 7/2004 | Rodriguez et al. |
| 2004/0228277 A1 | 11/2004 | Williams |
| 2005/0027503 A1 | 2/2005 | Kumar et al. |
| 2005/0180415 A1* | 8/2005 | Cheung et al. ............. 370/389 |
| 2005/0190781 A1 | 9/2005 | Green et al. |
| 2006/0184973 A1 | 8/2006 | De Heer et al. |
| 2006/0242240 A1 | 10/2006 | Parker et al. |
| 2007/0106782 A1 | 5/2007 | Ver Steeg et al. |
| 2007/0107023 A1 | 5/2007 | Ver Steeg et al. |
| 2007/0107024 A1 | 5/2007 | Ver Steeg et al. |
| 2007/0121629 A1 | 5/2007 | Cuijpers et al. |
| 2007/0130393 A1 | 6/2007 | VerSteeg |
| 2007/0277210 A1 | 11/2007 | Yousef |
| 2008/0022320 A1 | 1/2008 | Ver Steeg et al. |
| 2008/0109692 A1 | 5/2008 | Ver Steeg et al. |
| 2008/0192839 A1* | 8/2008 | Gahm et al. .......... 375/240.26 |
| 2008/0244667 A1 | 10/2008 | Osborne |
| 2008/0244679 A1 | 10/2008 | Sukumar et al. |
| 2009/0031342 A1 | 1/2009 | Ver Steeg et al. |
| 2009/0031392 A1 | 1/2009 | Ver Steeg et al. |
| 2009/0077255 A1* | 3/2009 | Smith et al. ................ 709/231 |
| 2009/0259763 A1 | 10/2009 | Karlsson |
| 2010/0036963 A1* | 2/2010 | Gahm et al. ............... 709/231 |
| 2010/0199152 A1 | 8/2010 | Ver Steeg |

FOREIGN PATENT DOCUMENTS

| | | |
|---|---|---|
| EP | 1 294 193 | 3/2003 |
| WO | WO 99/09741 | 2/1999 |
| WO | WO 2005/020556 | 3/2005 |
| WO | WO 2006/019505 | 2/2006 |
| WO | WO 2007/044562 A1 | 4/2007 |

OTHER PUBLICATIONS

Gahm; U.S. Appl. No. 12/188,724, filed Aug. 8, 2008.

Degrande, Natalie, et al., "Increasing the User Perceived Quality for IPTV Services", IEEE Communications Magazine, Feb. 2008, pp. 94-100.

William C. Ver Steeg, "Systems and Methods of Deferred Error Recovery," U.S. Appl. No. 12/364,950, filed Feb. 3, 2009.

International Search Report dated Jan. 28, 2010 cited in Application No. PCT/US2009/053130.

U.S. Office Action dated Jun. 25, 2010 cited in U.S. Appl. No. 12/188,724.

U.S. Final Office Action dated Dec. 6, 2010 cited in U.S. Appl. No. 12/188,724.

* cited by examiner

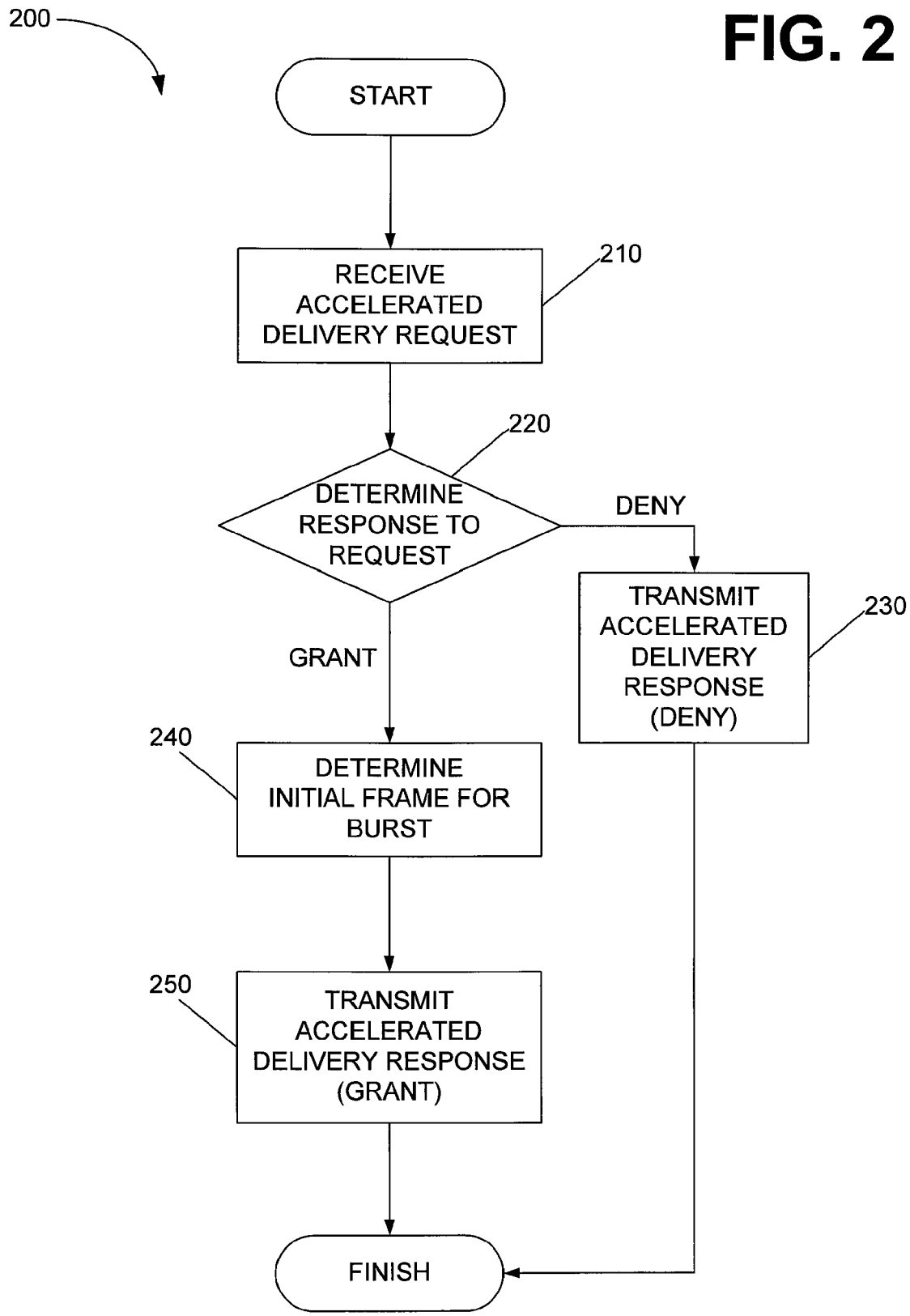

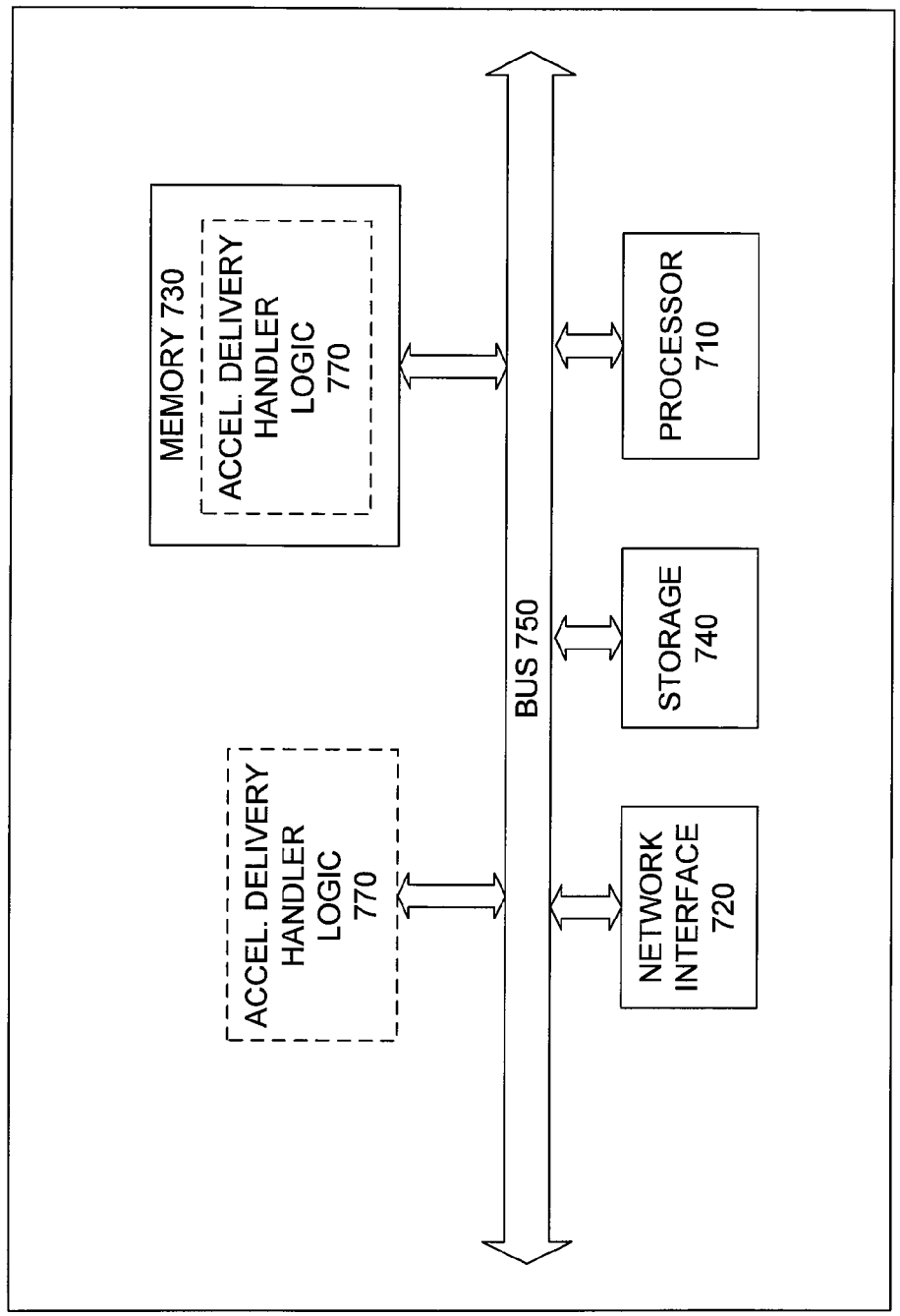

SYSTEMS AND METHODS OF REDUCING MEDIA STREAM DELAY

CROSS REFERENCE TO RELATED APPLICATIONS

Not applicable.

FIELD OF THE DISCLOSURE

The present disclosure relates to digital media delivery, and more specifically, to systems and methods of reducing media stream delay.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). These services are transported over a network as media streams. At the customer premises, a digital media receiver decodes one or more media streams. The digital media receiver also generates a picture signal for display by a television or monitor. A switch to a different media stream results in a finite amount of delay before the new stream can be decoded and displayed. Thus, a need arises to reduce this delay.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 2 is a flowchart illustrating operation of an accelerated delivery handler from FIG. 1, in some embodiments of systems and methods of reducing media stream delay.

FIG. 7 is a hardware block diagram of one embodiment of the accelerated delivery handler from FIG. 1.

DETAILED DESCRIPTION

Overview

Embodiments are disclosed herein that provide systems and methods of reducing media stream delay. One such embodiment is a method which includes receiving a request for accelerated delivery of a specified media stream. The method also includes deciding to grant or deny the accelerated delivery request based on a group of factors including resource usage, current network congestion, or a combination thereof. The method also includes responding to the accelerated delivery request with a response indicating the decision to grant or deny.

Another such embodiment is a method which includes receiving a request for accelerated delivery of a specified media stream. The request includes a requested burst size. The method also includes deciding to grant or deny the accelerated delivery request based at least in part on the requested burst size. The method also includes responding to the accelerated delivery request with a response indicating the decision to grant or deny and further indicating a granted burst size when the decision is to grant.

Example Embodiments

Figure 1:
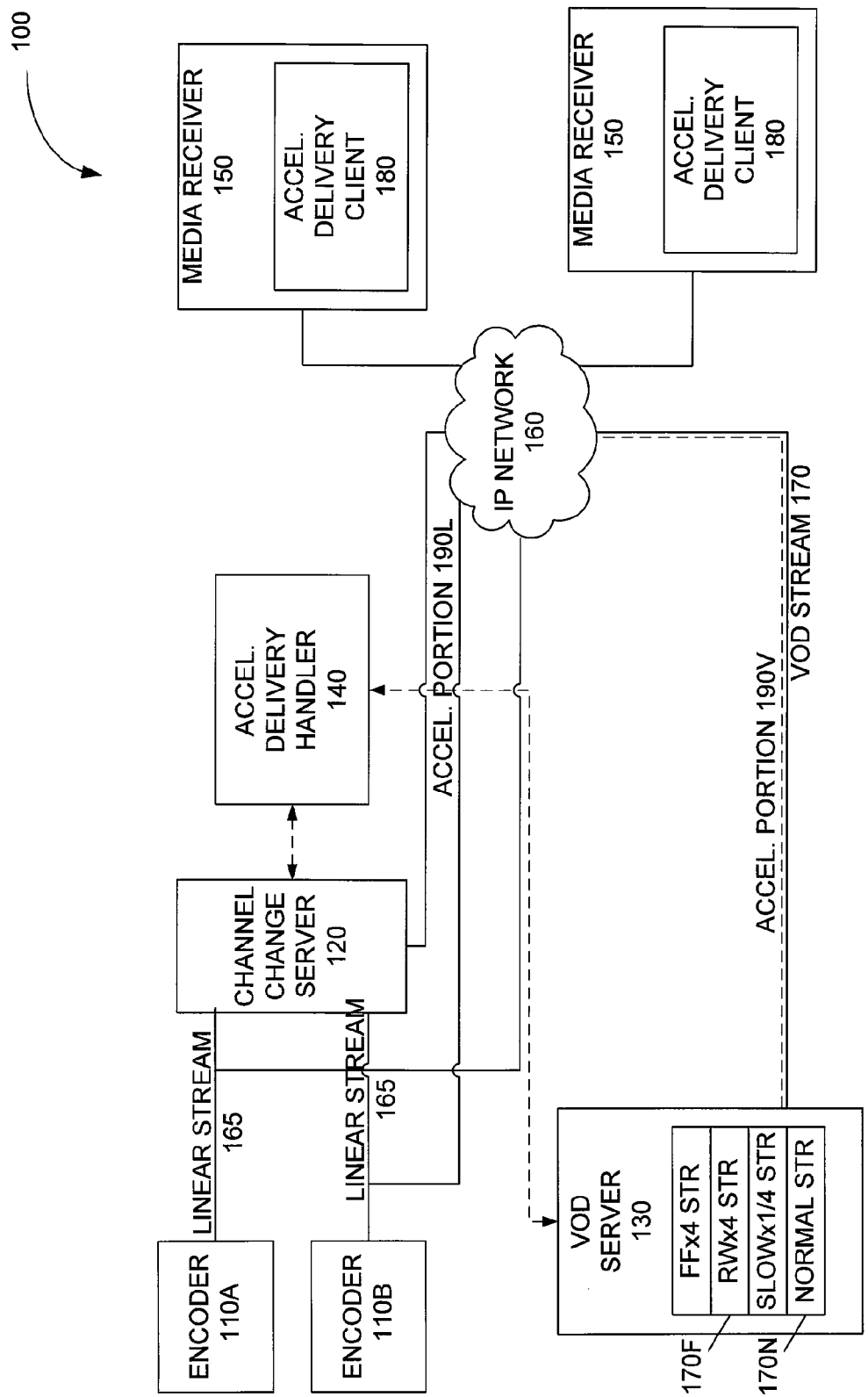
FIG. 1 is a block diagram of an environment in which one embodiment of a system and method for reducing media stream delay is located.

FIG. 1 is a block diagram of an environment in which one embodiment of a system and method for reducing media stream delay is located. System 100 delivers various digital services to subscribers using the Internet Protocol (IP). Such services include, but are not limited to, television programming, video-on-demand, pay-per-view, music, Internet access, shopping, and voice (i.e., telephone). System 100 comprises: one or more media encoders 110; a channel change server 120; a video-on-demand (VOD) server 130; an accelerated delivery handler 140; and at least one digital media receiver 150. The components other than digital media receiver 150 are sometimes referred to as "the headend" or as being located at the headend, though not limited to that location. The components of system 100 communicate over an IP network 160.

Each encoder 110 takes as input a signal from a broadcast source of television or video programming (such as cable networks or on-air television stations) and outputs a digital media stream that is compressed and encoded. Common encoding formats include MPEG-2, MPEG-4, and VC-1, but others are contemplated to be within the scope of this disclosure. In an IPTV environment, this digital stream represents a single program, so the stream typically contains a video elementary stream and an audio elementary stream. In this disclosure, the term "media stream" or "stream" refers to a stream that includes video frames, audio frames, multimedia, or any combination thereof.

The output of an encoder 110 is referred to here as a linear media stream 165 because the broadcast programming provided by encoders 110 is "linear": the program plays out in a linear fashion. Linear streams 165 are captured and buffered for some period of time in channel change server 120 to provide channel change capabilities, as will be described below.

In contrast to the linear streams output by encoders 110, the output of VOD server 130 is referred to as an on-demand or VOD media stream 170 because various portions of the program can be accessed at random at the user's request. Digital media receiver 150 provides this random access through various "trick mode" play options, such as rewind, fast forward, slow, pause, etc. To support random access, VOD server 130 typically dynamically computes (at playout) or stores (at ingest) one or more trick mode streams (170T) for each program, in addition to a stream for regular playout (170R). In addition to the streams output by encoders 110 and VOD server 130, other servers (not shown) may generate other types of streams to provide various other services.

Linear streams 165 and VOD stream 170 are transmitted over network 160 to one or more digital media receivers 150. In one embodiment, the streams traveling over network 160 include Moving Picture Experts Group (MPEG) Transport Stream (TS) packets, while in another embodiment, VC-1 streams are used instead. In some embodiments, the MPEG TS packets are encapsulated within UDP packets, which are in turn encapsulated within IP packets. In other embodiments, the MPEG TS packets are encapsulated within RTP packets, which are in turn encapsulated within UDP and then IP packets. (The use of IP packets to carry program streams is commonly referred to as "IPTV".) In some embodiments, IP multicast is used to deliver linear programming to digital media receivers 150, while VOD programming uses IP unicast to deliver streams to digital media receivers 150, but other addressing modes for various types of programming are also contemplated.

Each digital media receiver 150 converts the stream of IPTV packets into a standard analog or digital video signal, which is supplied to a display (e.g., a television or computer monitor) for viewing by the customer. Some embodiments of digital media receiver 150 also provide interactive features, such as an electronic program guide (EPG), Web browser, or DVR (digital video recorder) functionality. In some embodiments, digital media receiver 150 takes the form of a set-top box (e.g, digital home communication terminal or DHCT) connected to a television. In others, digital media receiver 150 is implemented by a personal computer (PC). In still other embodiments, digital media receiver 150 is implemented as a mobile device (e.g., personal digital assistant, mobile phone, digital media player, etc.).

Various stream transition events can result in digital media receiver 150 receiving a post-transition stream that is different than the pre-transition stream. For example, a channel change results in delivery of a new stream carrying the requested channel, and a trick mode request results in delivery of a new stream carrying the same content in a different mode (e.g., fast forward). These two transitions are user-initiated. Other transitions are network-initiated. For example, the network may transition automatically to a new stream to deliver an advertisement that is selected based on context or user behavior. As another example, the same content can be delivered as a new stream from a different source, in order to implement load balancing or failover in video-on-demand or other types of content servers. In some cases digital media receiver 150 is unaware of the new source.

The stream transition results in some amount of delay before the content can be decoded and displayed. Several factors may contribute to this delay. One factor is a buffering delay which ensures that the decoder buffer in the digital media receiver 150 does not under run during decode of a relatively large sequence of frames. In the case of MPEG video, this buffer delay may correspond to the Program Clock Reference (PCR)/Presentation Time Stamp (PTS) offset. Yet another factor is group-of-pictures (GOP) delay, which is the time for a digital media receiver 150 to obtain the first intra-coded frame (e.g., an I-frame in MPEG) after switching to a new stream. When error repair techniques such as forward error correction (FEC) and retransmission are used, an additional buffering stage further adds to the delay after a program stream switch. When multicast is used to deliver IPTV, a channel change involves leaving the old multicast group and joining a new multicast group. The multicast leave and join process incurs some amount of delay.

Delay after a stream transition event is reduced in one embodiment by the accelerated delivery techniques described herein, implemented by accelerated delivery client 180 in digital media receiver 150 and by accelerated delivery handler 140. In some embodiments, accelerated delivery handler 140 is integrated into another hardware/software component, such as channel change server 120 or VOD server 130. In other embodiments, accelerated delivery handler 140 is a separate component. Persons of ordinary skill in the art should appreciate in the context of the present disclosure that the functionality of accelerated delivery handler 140 can be distributed in other ways and among other components as well.

As described earlier, digital media receiver 150 receives one stream before a stream transition event (the pre-transition stream) and a different stream after the stream transition event (the post-transition stream). Accelerated delivery client 180 reduces stream transition delay by responding to a stream transition event at digital media receiver 150 with a request for accelerated delivery of the post-transition stream (also referred to herein as a "burst"). The request includes a desired burst size, which may be expressed in various ways, such as a number of frames, or a number of bytes, or a unit of time or a combination thereof. The accelerated portion (190) of the post-transition stream may be delivered using any of various IP addressing modes, such as unicast or multicast. In some embodiments, client 180 responds to the stream transition event itself. In other embodiments, client 180 responds indirectly, by responding to a depleted decoder buffer (which results from the delay after the transition event).

Accelerated portion 190 is delivered at a faster rate than the nominal rate of the post-transition stream. (Accelerated portion 190 may also be referred to herein as a "burst".) When delivery of accelerated portion 190 is complete, the remaining portion of the post-transition stream is delivered at its nominal rate. For example, when a user switches from a high definition channel to a low definition channel, the accelerated delivery will be fast relative to the nominal rate of the low definition channel, but not relative to the nominal rate of the high definition channel.

In some contexts, accelerated portion 190 and the pre-transition stream have different sources. For example, when the stream transition event is invoked by a channel change, the pre-transition stream (165) originates from encoder 110 while the accelerated portion of the post-transition stream (190L) originates from channel change server 120. In other contexts, the pre-transition stream and the accelerated portion of the post-transition stream have the same source. For example, when the stream transition event is a video-on-demand trick mode request, the pre-transition normal rate stream (170) and the accelerated portion of the post-transition stream (190V) may originate from VOD server 130. In such contexts, other information associates the accelerated portion of the VOD stream 190V with the VOD pre-transition normal rate stream 170 (e.g., a session identifier or a continuous sequence number space).

On receipt of an accelerated delivery request from accelerated delivery client 180, accelerated delivery handler 140 grants or denies the request. In case of a grant, the communication back to accelerated delivery client 180 includes the granted burst size, which may be different than the requested burst size. Accelerated delivery client 180 adapts its behavior based on whether the accelerated delivery is granted or denied, and on the granted burst size. The operation of accelerated delivery client 180 and accelerated delivery handler 140 will be described in further detail in connection with FIGS. 2, 3A-D, and 4A-C, but a brief overview is now presented.

On a decision to grant, accelerated delivery handler 140 determines the starting frame for accelerated portion 190, then interacts with channel change server 120 and/or VOD server 130 (as appropriate) to retrieve or generate accelerated portion 190 from a linear stream 165 or a VOD stream 170. Note that some embodiments of accelerated delivery handler 140 reduce delays resulting from channel change events by interacting with channel change server 120, some embodiments interact with VOD server 130 to reduce delays resulting from trick mode events, and some embodiments do both.

After receiving the first frame in the accelerated delivery, accelerated delivery client 180 directs the decoder to perform "early start" playback by decoding the buffered stream immediately, rather than waiting for the decoder buffer or error repair buffer(s) to fill to their usual thresholds (the latter which is a conventional technique). The early start playback is combined with either decoding at a reduced rate ("slow playout"), or decoding at the normal rate while filling the decoder and/or error repair buffers at a faster rate from a received stream ("fast fill"). The choice between slow playout and fast fill at accelerated delivery client 180 depends on the result of the accelerated delivery request, as will be described further in connection with FIGS. 2 and 3A-D.

FIG. 2 is a flowchart illustrating operation of accelerated delivery handler 140 in some embodiments of systems and methods of reducing media stream delay. Process 200 begins at block 210, where accelerated delivery handler 140 receives an accelerated delivery request for a specified media stream. The media stream may be identified by a variety of mechanisms, including a name, a Uniform Resource Locator or a Uniform Resource Identifier, an IP address and port number, among others. In some embodiments the request includes a requested burst size.

At block 220, accelerated delivery handler 140 decides whether to grant or deny the request. In determining the action, a variety of factors may be considered, including those related to current resource usage, characteristics of the entitlement attributes associated with the requesting digital media receiver 150, and the expected effect of the accelerated delivery on the requesting digital media receiver 150.

A list of factors (meant as examples rather than an exhaustive list) includes:

Current resource usage on accelerated delivery handler 140, indicating whether the server has excess capacity to service the request or is close to running out of resources.

Current congestion on the network path which will be used to send the accelerated delivery content to digital media receiver 150.

The burst size requested by accelerated delivery client 180.

Parameters, such as service level agreement (SLA) parameters, used to enforce preferential or fair treatment in delivering content to the requesting digital media receiver 150.

The expected result of the accelerated delivery, in terms of how much delay is expected to be incurred if the accelerated delivery request is denied as compared to if the request is granted.

The size of the burst that would result from various choices of starting frames. The server has several choices of frames to start the accelerated delivery, some earlier and some later. When multicast is used for delivery of linear stream 165, choosing an earlier frame implies a longer time for accelerated delivery because doing so takes longer to catch up to the in-progress multicast stream carrying the new channel.

These factors can be combined, weighted, and balanced in various ways, as should be understood by a person of ordinary skill in the art.

If the decision at block 220 is to deny the request, then processing continues at block 230, where a negative response to the accelerated delivery request is transmitted to accelerated delivery client 180. Process 200 is then complete. However, if the decision at block 220 is to grant the request, then block 240 determines which frame will start the accelerated delivery.

In determining the initial frame, a variety of factors may be considered, including those related to current resource usage, characteristics of the subscriber's entitlement attributes, and the expected result of the accelerated delivery. A non-exhaustive list of such factors was presented above in connection with block 220. In some embodiments, the initial frame selected for the accelerated delivery is an intra-coded frame. This may be appropriate, for example, when the accelerated delivery request occurs as a result of a channel change event or a trick mode event. In other embodiments, the initial frame selected for the accelerated delivery is one that reduces delay time at the digital media receiver 150 by a target amount. This may be appropriate, for example, when the accelerated delivery request occurs as a result of a switchover from one content source to another. When targeting a delay time, the initial frame selected is not necessarily an intra-coded frame.

After determining which frame will start the accelerated delivery in block 240, processing continues at block 250, where a positive response to the accelerated delivery request is transmitted to accelerated delivery client 180. This accelerated delivery response includes the size of the burst that will be provided to digital media receiver 150, which may be different than the size of the burst requested by digital media receiver 150. An accelerated portion 190 starting with the frame that is selected at block 240 is then provided to digital media receiver 150 (not shown). In some embodiments, accelerated portion 190 is provided directly by accelerated delivery handler 140, while in other embodiments, accelerated delivery handler 140 directs or instructs another component to provide accelerated portion 190 to digital media receiver 150. Process 200 is then complete.

As described above, the decisions at blocks 220 and 240 involve weighing various factors. Several examples of weighing the factors follow. As one example, under conditions where the accelerated delivery is expected to reduce delay only a small amount, but accelerated delivery handler 140 has relatively low resource utilization and network congestion on the path to digital media receiver 150 is low, then block 220 could decide to grant the request. Furthermore, the first frame selected by block 240 could be old enough to ensure that the buffers were refilled from the received stream fast enough to avoid under run without the use of slow playout on digital media receiver 150. Conversely, in a situation where the network path is congested or resource usage on accelerated delivery handler 140 were close to capacity, block 220 could decide to deny the request even if a large delay is expected to be incurred at digital media receiver 150. On the other hand, under the same conditions block 220 could instead decide to grant while block 240 selected a more recent intra-coded frame as the starting point for the accelerated delivery.

As described above, at block 240 accelerated delivery handler 140 determines which frame will start the accelerated delivery. In some linear content embodiments, accelerated delivery handler 140 cooperates with channel change server 120 to select a starting point for the post-transition stream such that the accelerated portion of the post-transition stream is large enough to satisfy the minimum requested by accelerated delivery client 180. This input from accelerated delivery handler 140 allows channel change server 120 to deliver a larger accelerated portion of the post-transition stream than a conventional channel change server may have produced. Although a conventional channel change server may perform accelerated delivery of the post transition stream (as part of its normal change function), without input from accelerated delivery handler 140 the accelerated portion of the post-transition stream may not be of sufficient size to satisfy the request that is made by the client.

Figure 3A:
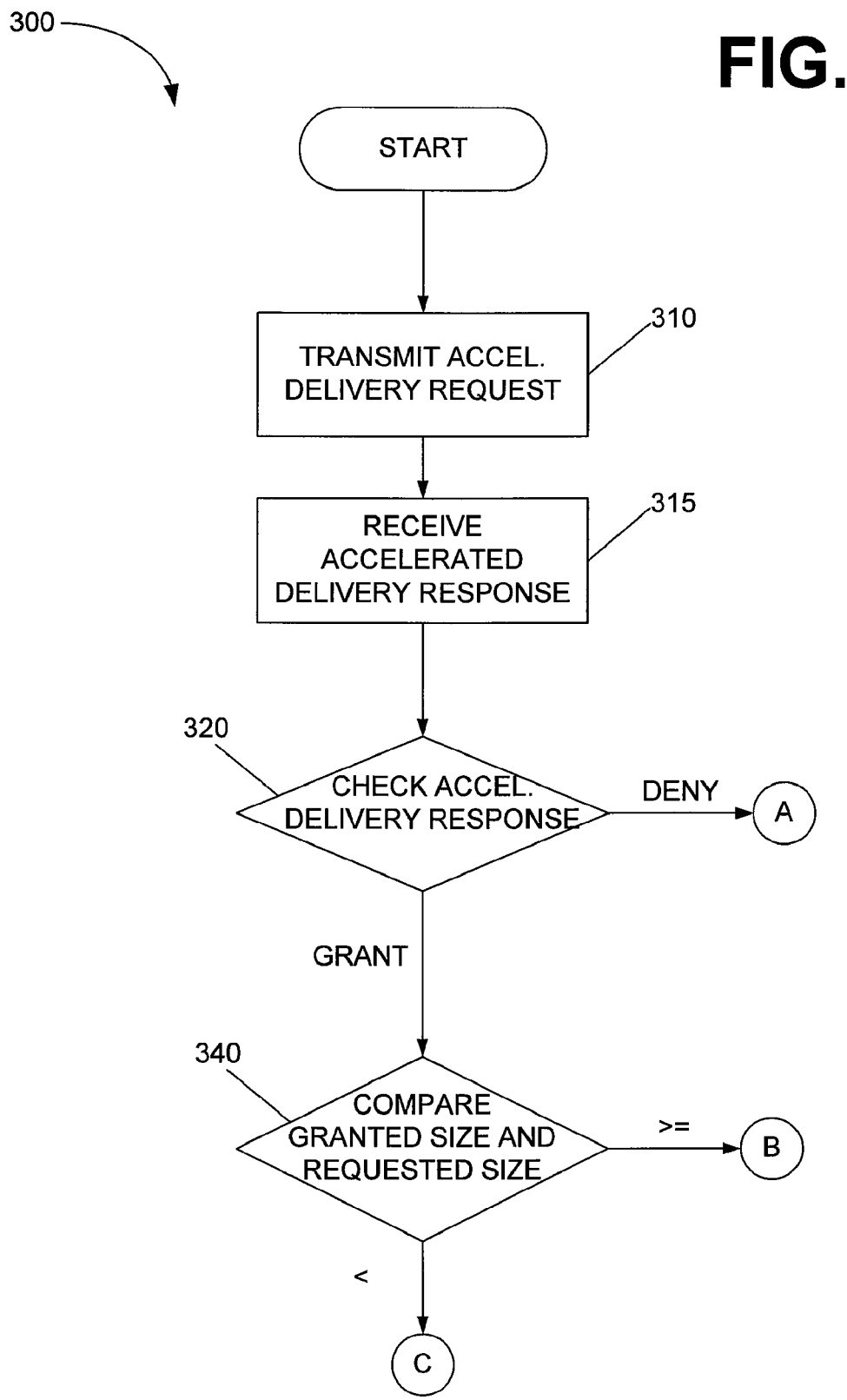
FIGS. 3A-D collectively comprise a flowchart which illustrates operation of an accelerated delivery client from FIG. 1, in some embodiments of systems and methods of reducing media stream delay.
Figure 3B:
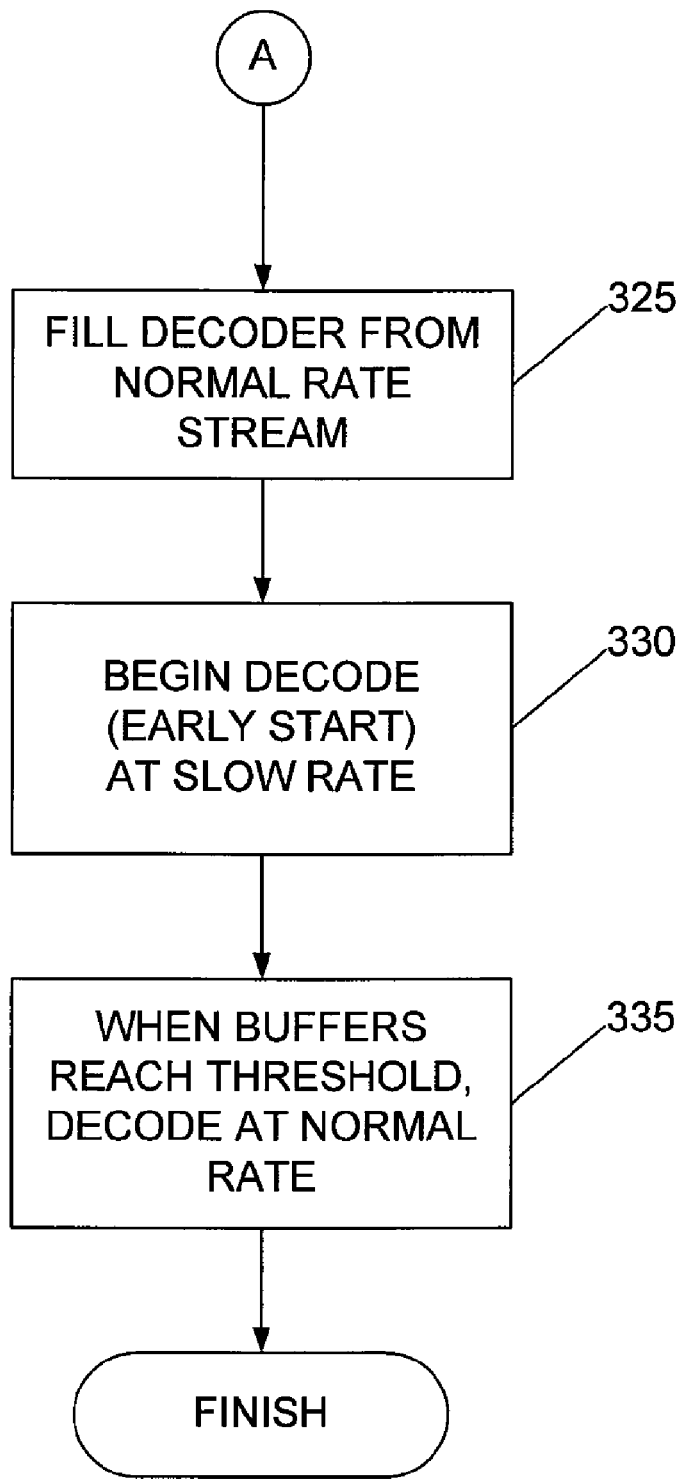

FIGS. 3A-D collectively comprise a flowchart which illustrates operation of accelerated delivery client 180 in some embodiments of systems and methods of reducing media stream delay. Turning to FIG. 3A, process 300 begins at block 310, where digital media receiver 150 transmits an accelerated delivery (burst) request to accelerated delivery handler 140. In some embodiments, the accelerated delivery request is triggered by the decoder buffer draining below a predetermined level. In some embodiments this may be a natural result of a delay in receiving new frames. In some embodiments, digital media receiver 150 flushes the buffer of the pre-transition media stream in response to a stream transition event.

The accelerated delivery request includes a requested burst size. The requested burst size is calculated by accelerated delivery client 180 to be the minimum amount of data that permits the decoder in digital media receiver 150 to perform a fast fill of its decoder underrun buffer and any error repair buffers within digital media receiver 150, while also performing an early start decode. Both fast fill and early start were described above in connection with FIG. 1, and the effect of burst size will be further discussed below. At block 315, accelerated delivery client 180 receives a response to the accelerated delivery request, indicating either grant or deny.

Block 320 examines the response, and if the accelerated delivery request is denied, processing continues (turning to FIG. 3B) at block 325, where the decoder buffer in digital media receiver 150 is filled from a stream delivered at a normal rate. At block 330, the decoder in digital media receiver 150 decodes and presents frames responsive to receiving of the first intra-coded frame, without waiting for the decoder underrun buffer or the error repair buffer to fill (a technique referred to herein as "early start"). To prevent an underrun condition, block 330 decodes and presents frames at either a slower than normal rate (a technique referred to herein as "slow playout"), or delays playout for a period of time. With the decoder draining buffers at a rate that is slower than the buffer fill rate or not at all, at some point the buffers fill back up to their required thresholds as frames are received from the network. Block 335 determines when this condition is reached, and begins decode/presentation at the normal rate. Process 300 is then complete.

Returning to the decision at block 320 of FIG. 3A, if the accelerated delivery request is granted then accelerated delivery client 180 makes a further determination at block 340, which compares the granted burst size relative to the requested burst size. If the granted size is greater than or equal to the requested size then digital media receiver 150 prepares for early start decode with a normal playout speed.

Figure 3C:
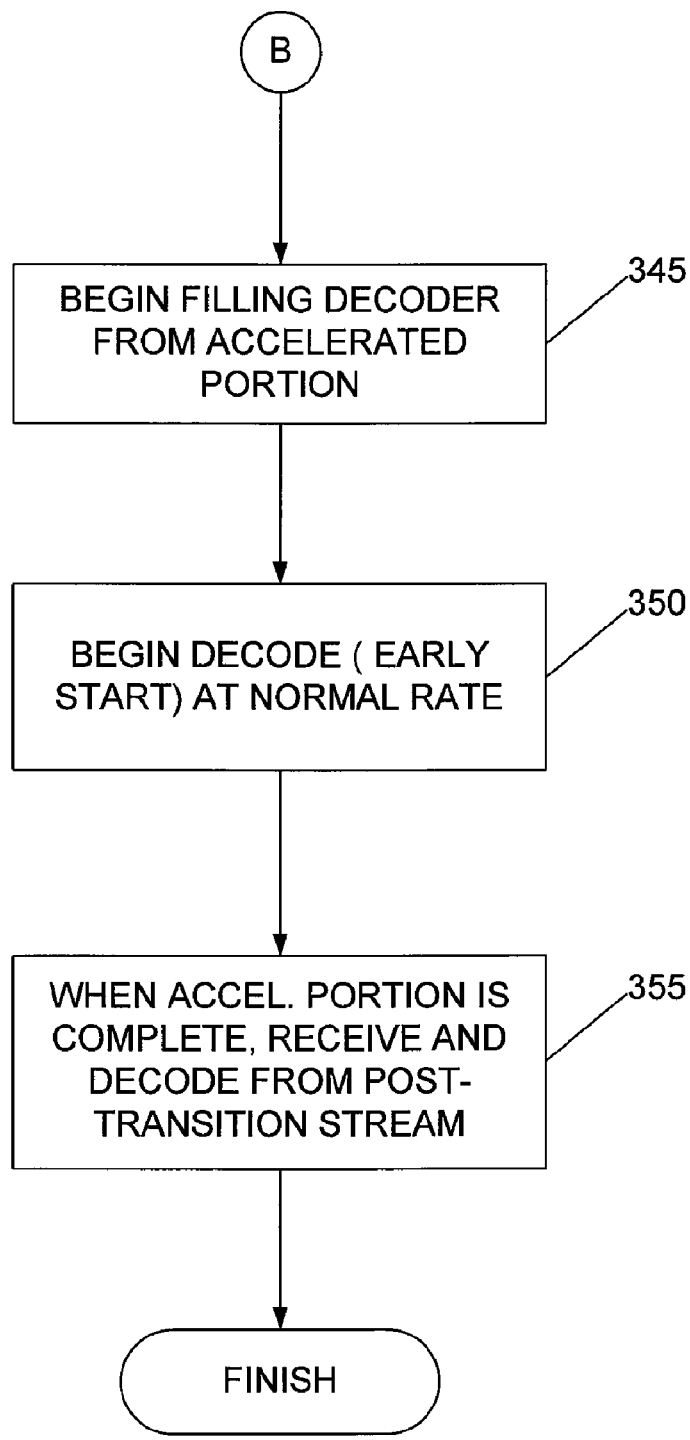

Turning to FIG. 3C, digital media receiver 150 and begins filling its buffers from the burst of frames delivered by accelerated delivery handler 140 (block 345). In some embodiments, the accelerated delivery portion of the stream is received on the unicast address, rather than a multicast group address, of digital media receiver 150. The accelerated delivery is transmitted at a rate that is faster than normal. At block 350, the decoder in digital media receiver 150 decodes and presents frames upon receipt of the first intra-coded frame, without waiting for the decoder underrun buffer or the error repair buffer to fill. These frames are decoded and presented at the normal playout (full-speed) rate. However, the buffer fill rate is faster than the drain rate because the accelerated delivery stream is faster than normal, so the buffer gradually fills as the accelerated delivery progresses. When the accelerated delivery portion of the stream catches up with the post-transition stream, accelerated delivery handler 140 stops transmitting, and the accelerated delivery ends. At that point, digital media receiver 150 begins receiving from the new multicast stream and decoding at the full playout-rate (block 355). Process 300 is then complete.

Figure 3D:
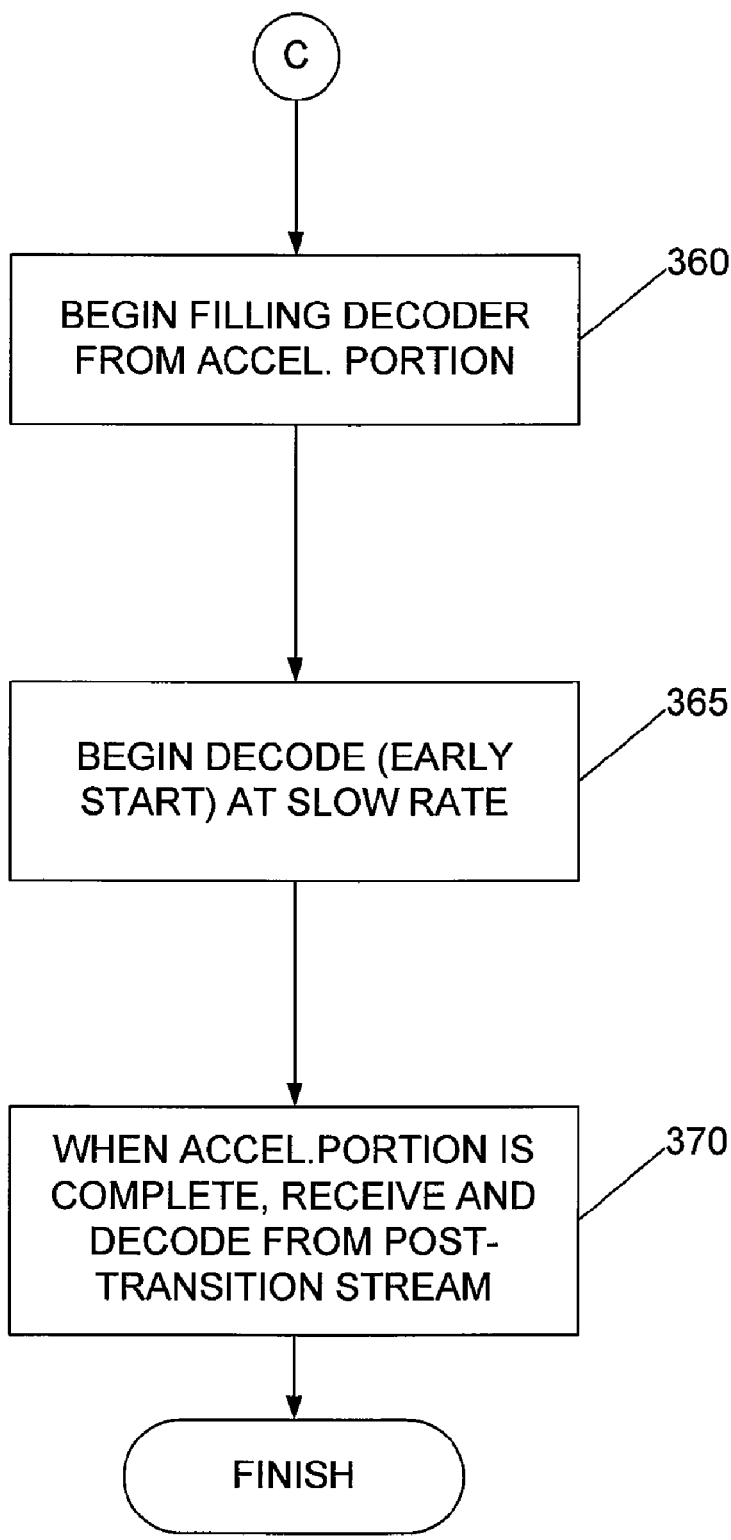

Returning to the decision at block 340 of FIG. 3A, if the granted burst size is less than the requested size, then digital media receiver 150 prepares for early start decode with slow playout. Turning to FIG. 3D, digital media receiver 150 receives the frames via accelerated delivery at block 360 on its unicast address rather than a multicast group address, and begins filling its buffers from the burst. At block 365, the decoder performs early start with slow playout: digital media receiver 150 decodes and presents frames upon receipt of the first intra-coded frame, without waiting for the decoder underrun buffer of the error repair buffer to fill. These frames are either decoded/presented at a slower than full-speed playout rate or playout is delayed for a period of time. The buffer fill rate is faster than the drain rate, due to the combination of slower playout and faster fill, so the buffer gradually fills as the accelerated delivery progresses. When the accelerated delivery portion of the stream catches up with the post-transition stream, accelerated delivery handler 140 stops transmitting, and the accelerated delivery ends. At that point, digital media receiver 150 begins receiving from the new multicast stream and decoding at the full playout-rate (block 370). Process 300 is then complete.

Figure 4A:
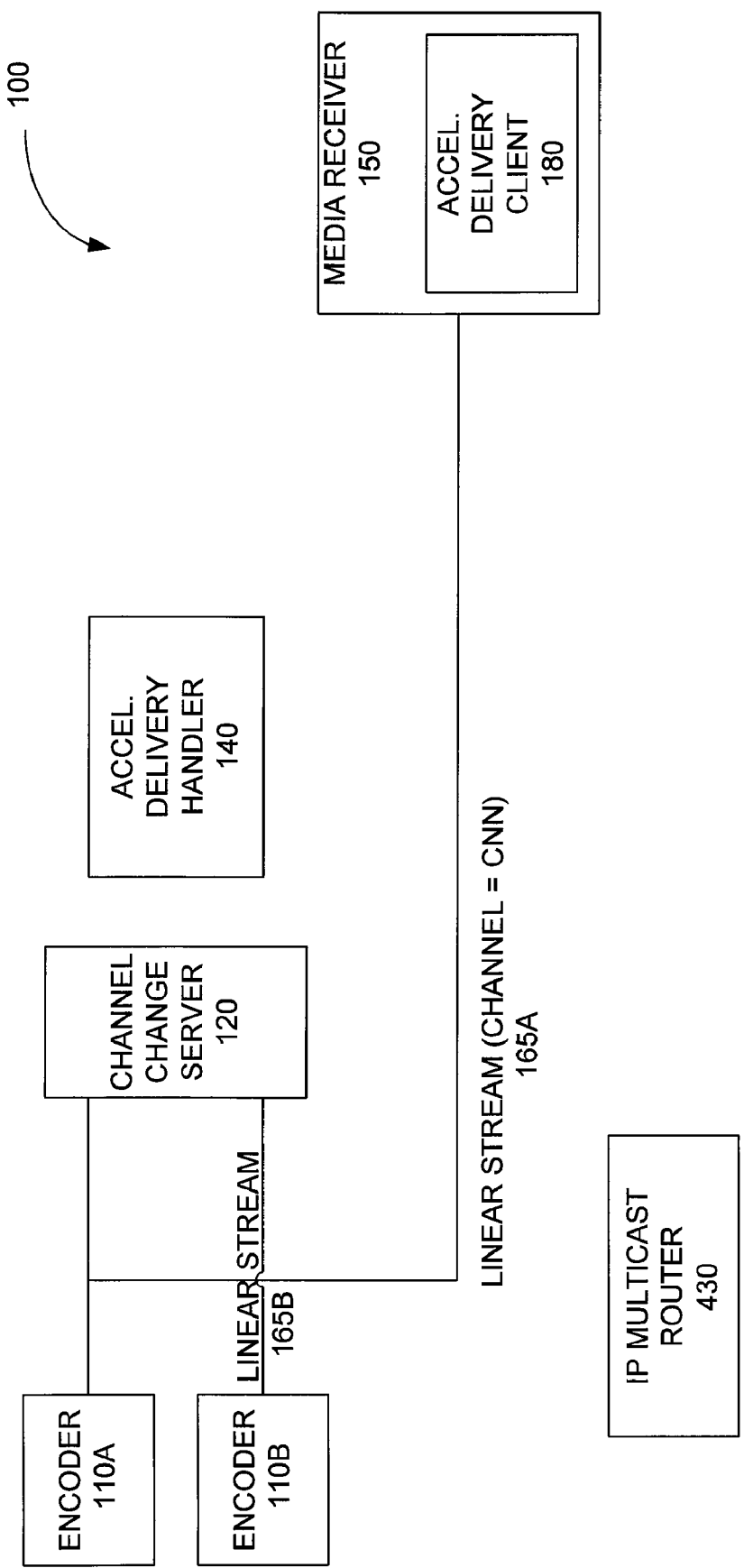
FIGS. 4A-C are sequence diagrams that illustrate an exchange of information, during an accelerated delivery resulting from a channel change event, between components in one embodiment of the system of FIG. 1.
Figure 4B:
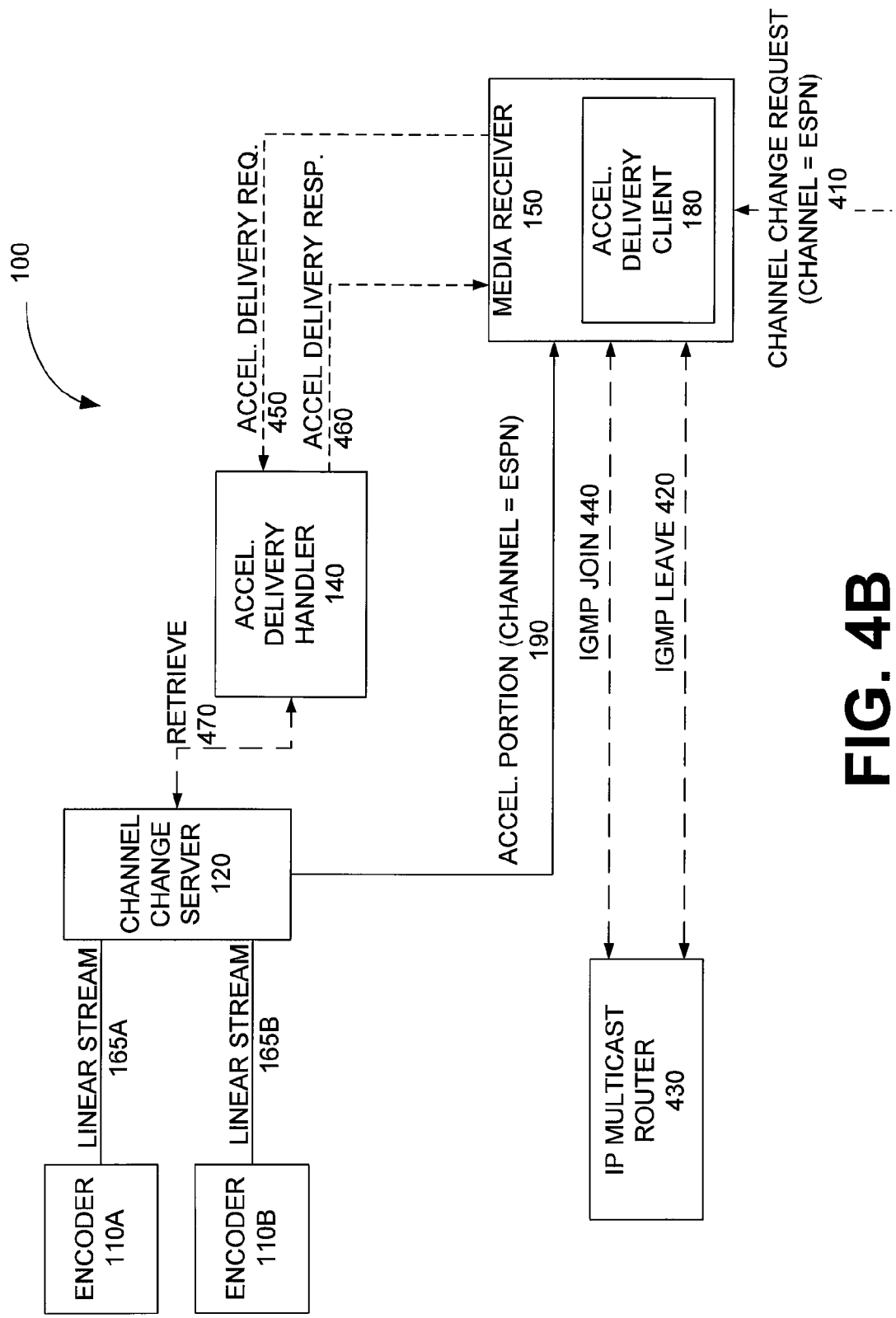
Figure 4C:
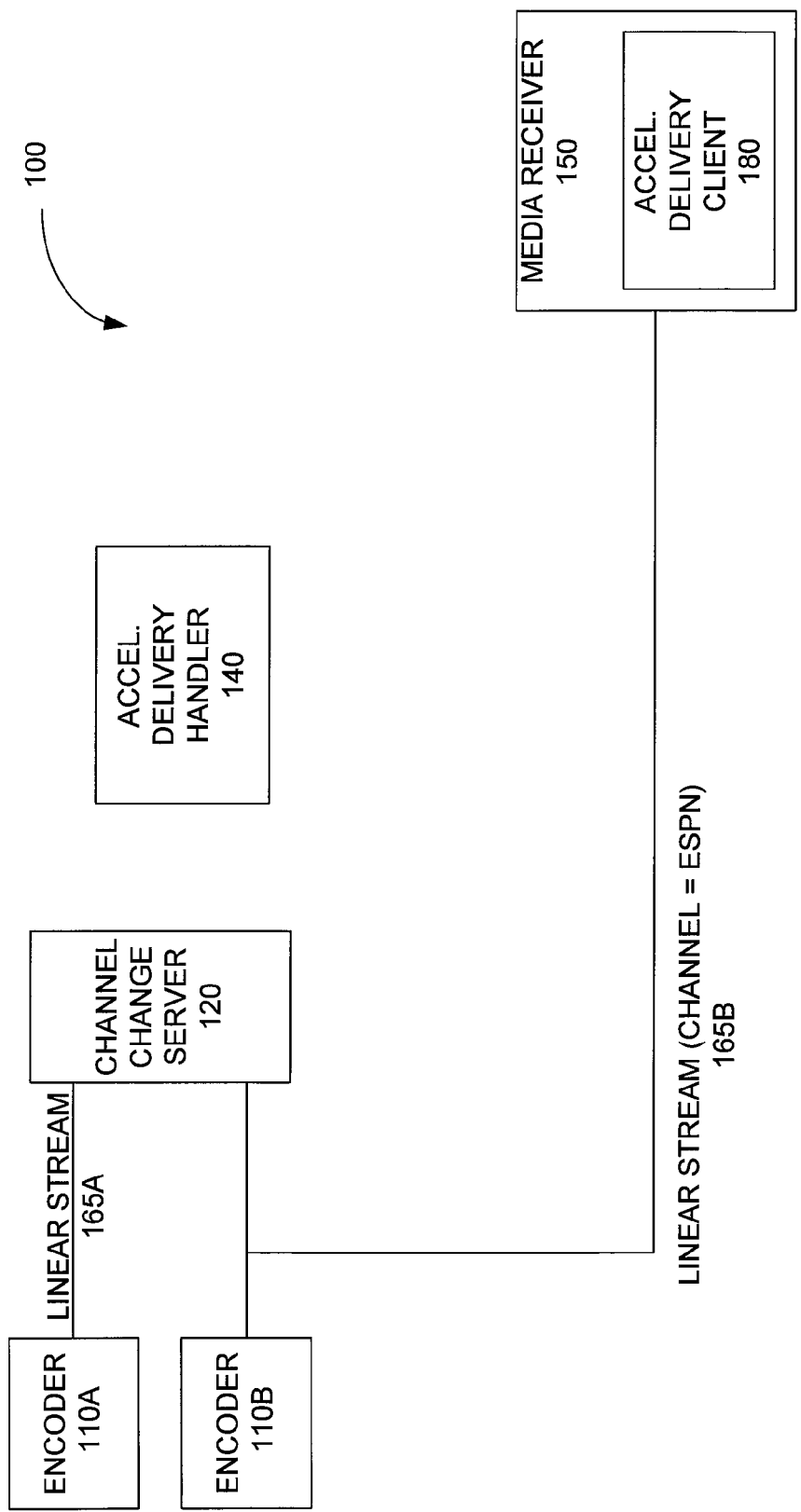
Figure 5A:
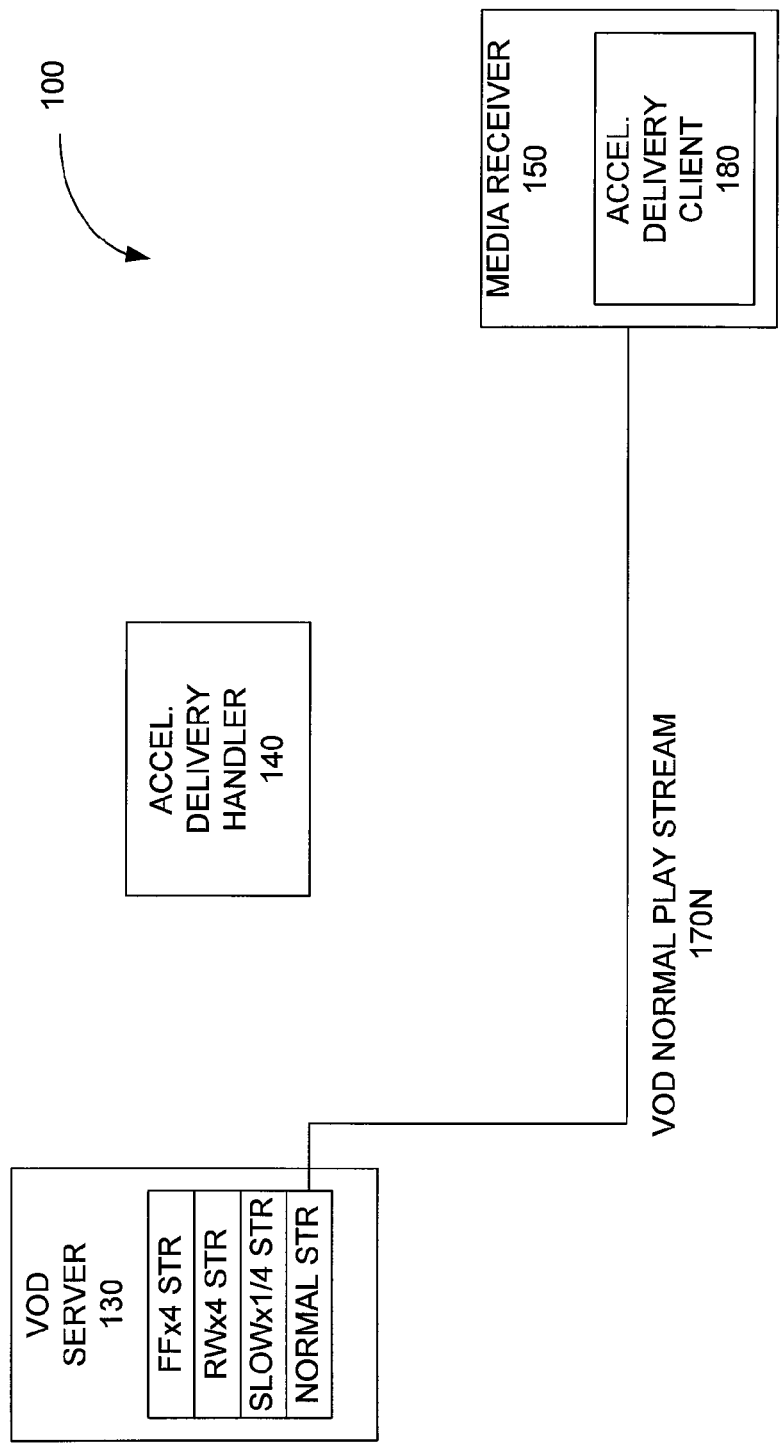
FIGS. 5A-C are sequence diagrams that illustrate an exchange of information, during an accelerated delivery resulting from a trick mode event, between components in one embodiment of the system of FIG. 1.
Figure 5B:
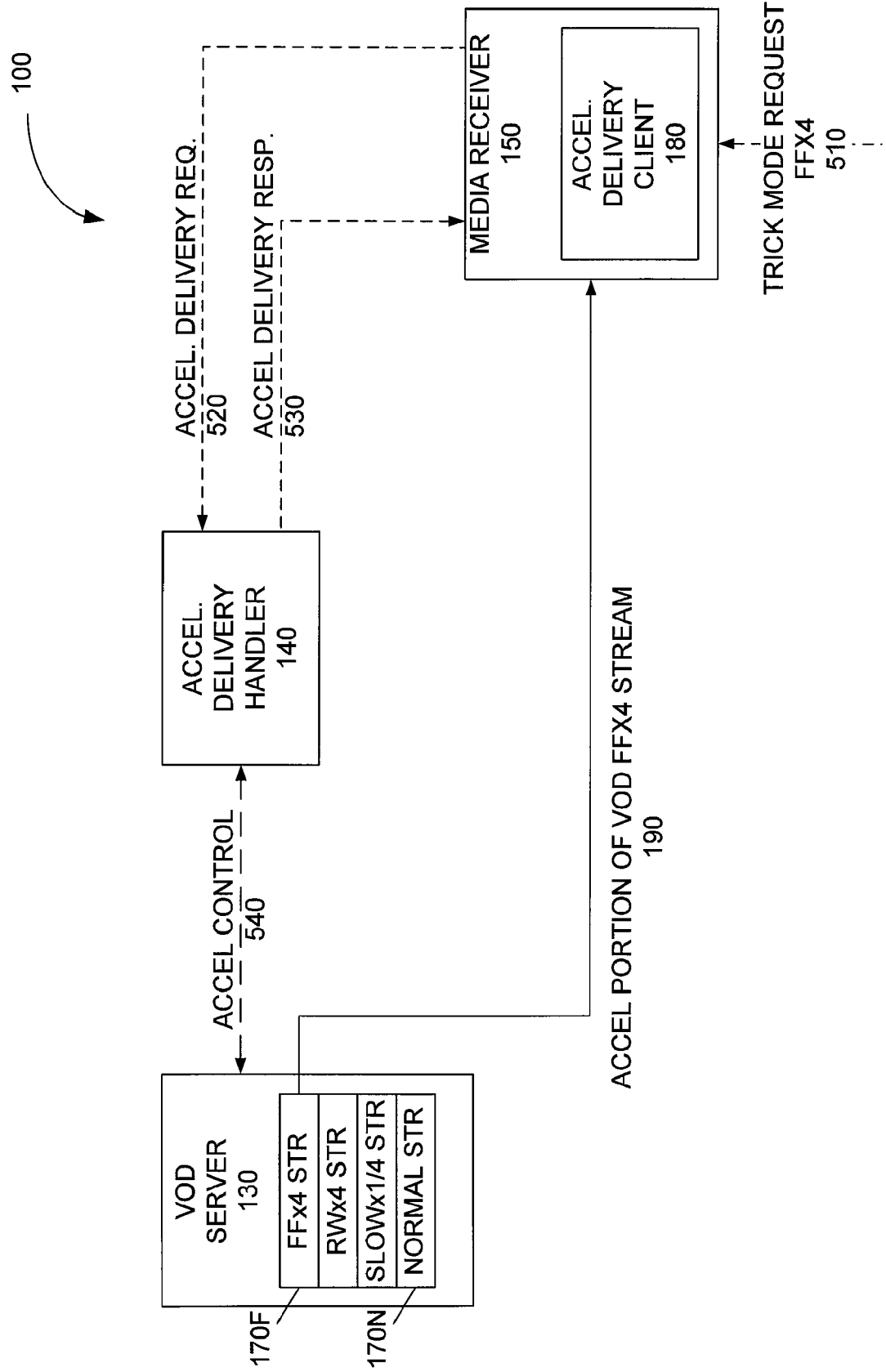
Figure 5C:
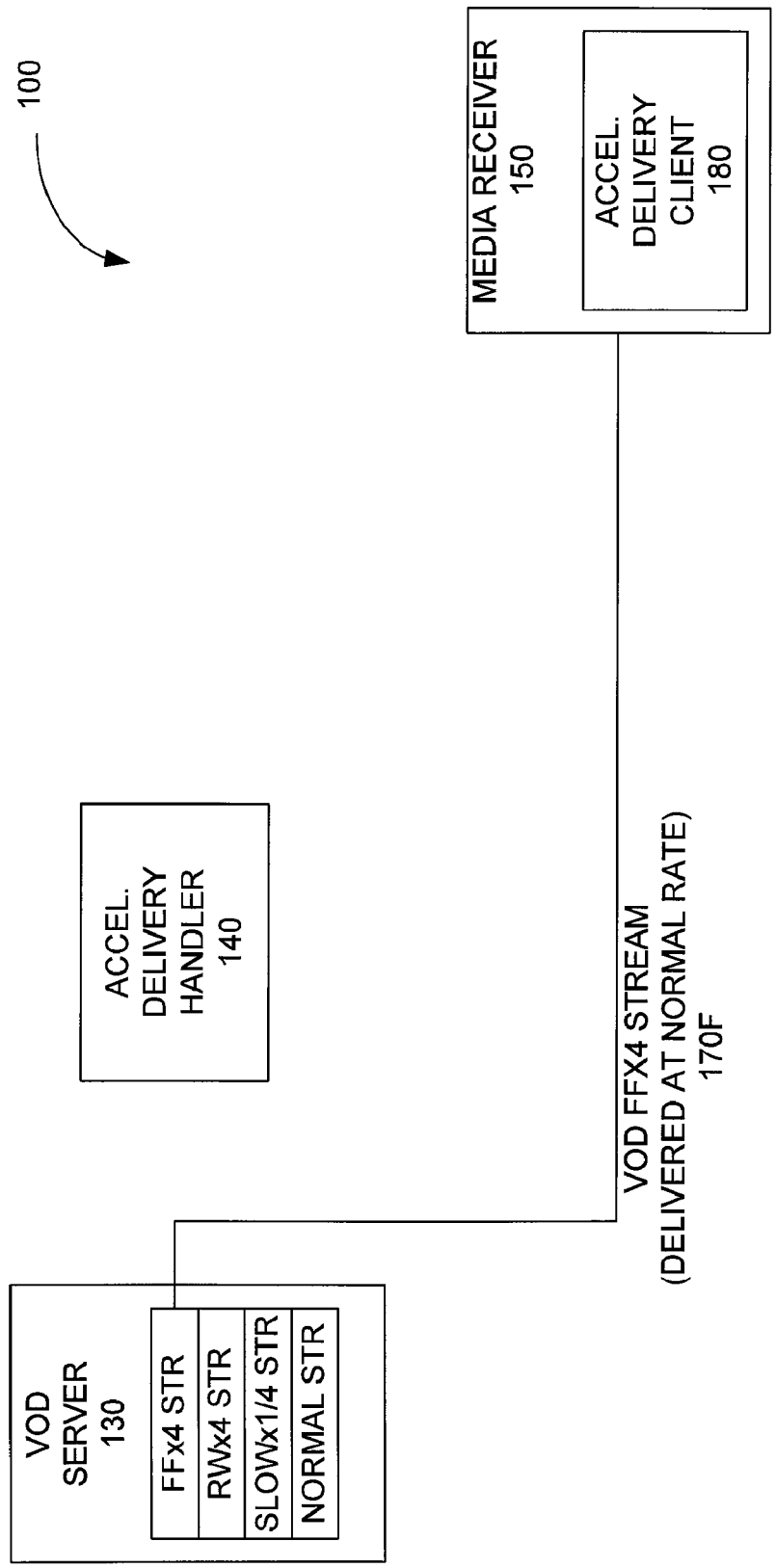

The accelerated delivery process will now be further explained in connection with the sequence diagrams of FIGS. 4A-C and FIGS. 5A-C. Each of these sets of figures forms a sequence that illustrates the exchange of information between components in system 100 during an accelerated delivery. FIGS. 4A-C illustrate data flow for accelerated delivery for a multicast stream transition. FIGS. 5A-C illustrate data flow for an accelerated delivery for a unicast stream transition. FIGS. 6A-D illustrate data flow for an accelerated delivery resulting from a stream switchover or failover. Some of the connections in system 100 have been simplified. For example, network 160 is not shown, and streams are shown as logical connections between devices, with intermediate devices left out.

FIG. 4A shows the initial state of system 100, when digital media receiver 150 is tuned to a particular programming source or channel (here, CNN) and receiving linear stream 165A produced by encoder 110A. In this example, the transition from multicast to unicast results from a channel change event. However, the principles described in connection with FIGS. 4A-C can be adapted to other multicast-to-unicast transitions.

FIG. 4B shows the sequence of events associated with a channel change event. Digital media receiver 150 receives (through event 410) a channel change command instructing digital media receiver 150 to switch to another program source (here, ESPN). In this example, network 160 uses IP multicast to implement the channel change, so digital media receiver 150 takes two sets of actions in response to channel change event 410. Some of the actions are related to IP multicast, while others are related to the accelerated delivery.

Persons of ordinary skill in the art should appreciate that the order of these actions can vary.

In order to stop receiving the current program, digital media receiver 150 responds to channel change event 410 by sending a request (420) to an IP multicast router 430, asking to be removed from the IP multicast group associated with the current channel (here, CNN). In this example embodiment, request 420 is implemented using an Internet Group Membership Protocol (IGMP) Leave message. As a result, IP multicast router 430 stops delivering linear stream 165A (carrying CNN) to digital media receiver 150. Later in the channel change process, digital media receiver 150 sends another request (440) to IP multicast router 430, asking to be added to the IP multicast group associated with the new channel (here, ESPN). As a result, network 160 starts delivering linear stream 165A (carrying newly requested ESPN) to digital media receiver 150.

The accelerated delivery aspect of channel change proceeds as follows. In response to channel change event 410, accelerated delivery client 180 within digital media receiver 150 sends an accelerated delivery request 450 to accelerated delivery handler 140. In response to accelerated delivery request 450, accelerated delivery handler 140 decides (in this example) to grant the request, and sends a positive response 460 including a granted burst size. Accelerated delivery handler 140 also retrieves (470) the corresponding buffered linear program stream from channel change server 120. Here, the corresponding stream is the buffered stream corresponding to 165B, produced by encoder 110B, since that stream corresponds to the requested new channel ESPN. In this embodiment, accelerated delivery handler 140 directs one another component, channel change server 120, to produce and deliver accelerated portion 190 to digital media receiver 150. In other embodiments, accelerated delivery handler 140 encapsulates buffered stream 165B to produce accelerated portion 190, and provides the stream to digital media receiver 150. As described earlier in connection with the flowcharts of FIG. 2 and FIGS. 3A-D, accelerated delivery client 180 directs the decoder to perform an early start decode of accelerated portion 190, using either delayed, slow or normal playout as appropriate.

FIG. 4C shows the state of system 100 when the accelerated delivery is complete. At some point before the decode of the accelerated portion is finished, digital media receiver 150 completes a transition to the newly joined multicast stream carrying the new channel (ESPN), which originates from encoder 110B as linear stream 165B. At that time, digital media receiver 150 splices the frames carried in the accelerated portion 190 together with the frames carried within the multicast stream. Finally, digital media receiver 150 receives and decodes only from the multicast stream carrying the requested channel (here, ESPN).

Having discussed data flow for accelerated delivery for a multicast context, accelerated delivery for a unicast context will now be described. FIG. 5A shows the initial state of system 100, before a trick mode request. Digital media receiver 150 receives VOD programming in the form of VOD normal play stream 170N, stored on VOD server 130. In this example, the transition from one unicast stream to another results from a trick mode request. However, the principles described in connection with FIGS. 4A-C can be adapted to other unicast-to-unicast transitions. An example of such a transition is a "pause ad", where a picture-in-picture advertisement is streamed to digital media receiver 150 in response to the user invoking the Pause function while viewing a buffered live broadcast, a video-on-demand program, or a recorded program.

FIG. 5B shows the sequence of events for an accelerated delivery request and response in the VOD context. Digital media receiver 150 receives (through event 510) a trick mode command instructing digital media receiver 150 to operate in fast-forward, quadruple-speed mode. In response to trick mode event 510, accelerated delivery client 180 sends an accelerated delivery request 520 to accelerated delivery handler 140. In response to accelerated delivery request 520, accelerated delivery handler 140 decides (in this example) to grant the request, and sends a positive response 530 including a granted burst size. Accelerated delivery handler 140 also instructs (540) VOD server 130 to produce and deliver the corresponding trick mode stream but at a faster rate, as accelerated portion 190. Here, the corresponding stream is stored VOD stream 170F, since that stream corresponds to the requested trick mode (here, fast-forward, quadruple-speed). In other embodiments, the accelerated portion of the stream is provided by accelerated delivery handler 140. In still other embodiments, yet another content server produces and delivers the accelerated portion of the stream under the direction of accelerated delivery handler 140.

As described earlier in connection with the flowcharts of FIG. 2 and FIGS. 3A-D, digital media receiver 150 performs an early start decode of accelerated portion 190, using either delayed, slow, or normal playout as appropriate, until the accelerated delivery is finished. When the accelerated delivery is finished, VOD server 130 delivers the same content (trick mode stream 170F) at a normal rate, as shown in FIG. 5C.

Having discussed data flow for an accelerated delivery in the unicast and multicast contexts, an accelerated delivery resulting from a stream switchover will now be described in connection with FIGS. 6A-D. This scenario involves multiple content servers having the same content, and arranged so that a stream delivered from one content server can be instead delivered from another. Such a configuration can be used for load balancing or for redundancy in case of failure.

Figure 6A:
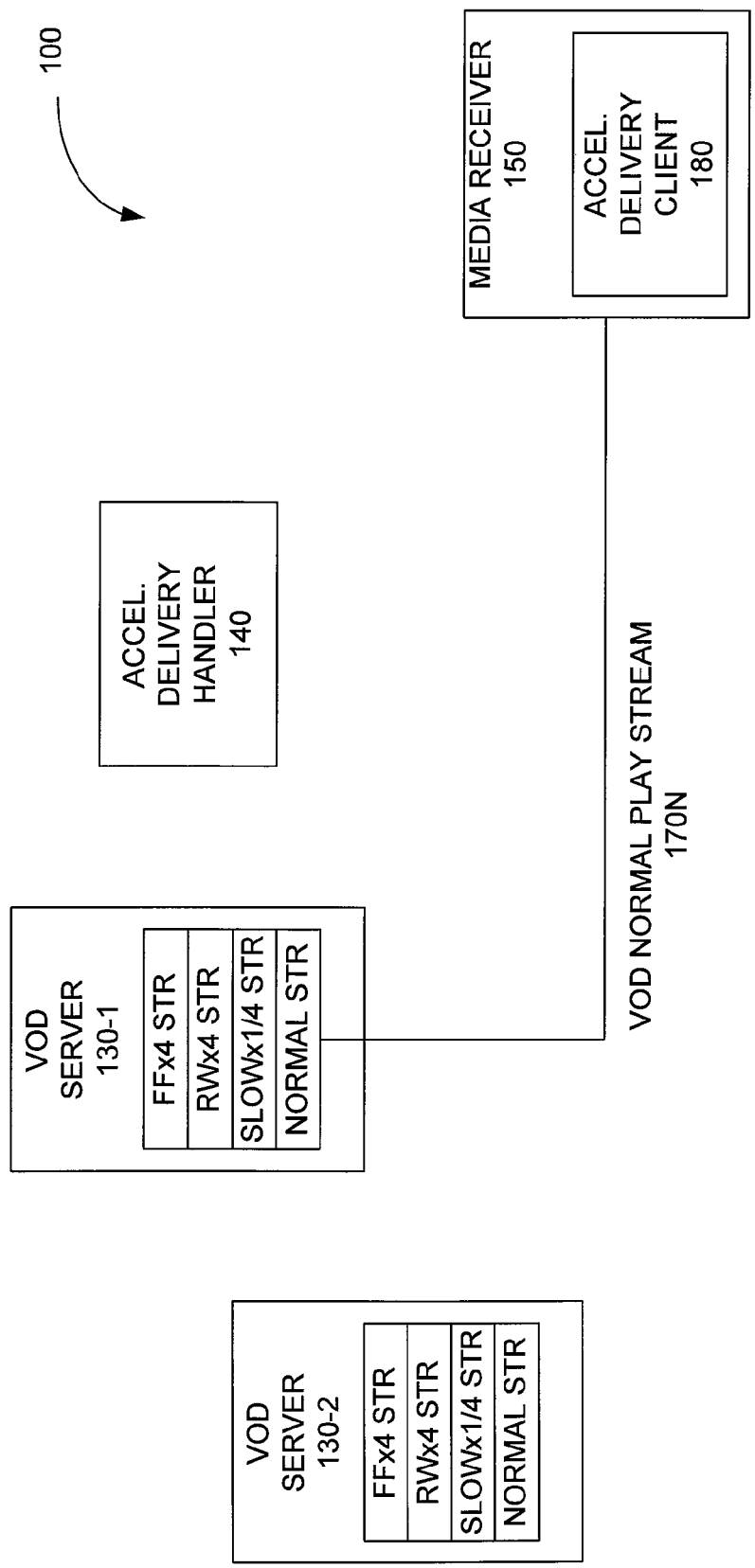
FIGS. 6A-D are sequence diagrams that illustrate an exchange of information, during an accelerated delivery resulting from a stream switchover event, between components in one embodiment of the system of FIG. 1.
Figure 6B:
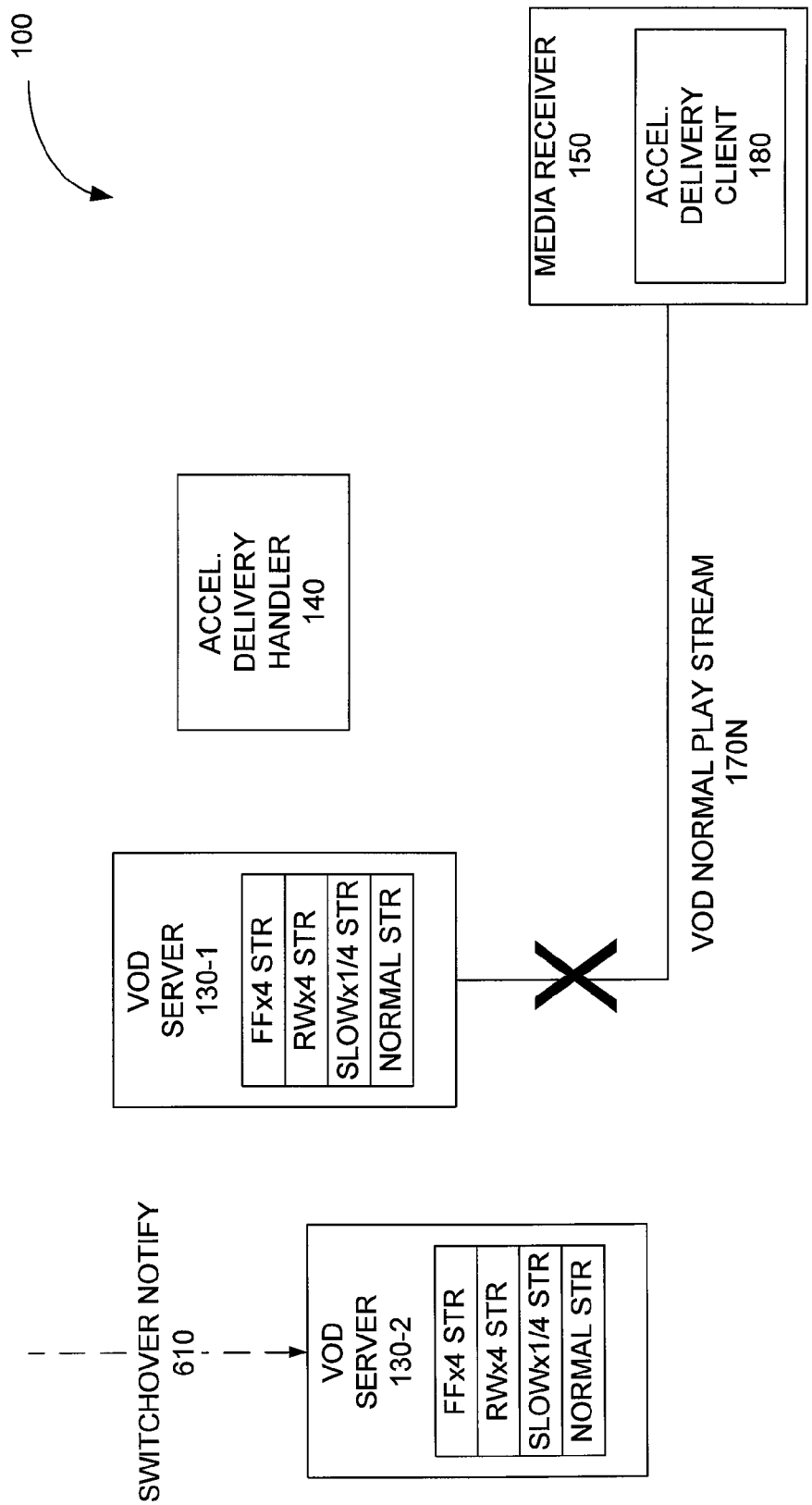

FIG. 6A shows the initial state of system 100, which includes VOD server 130-1 and VOD server 130-2. In this initial state, digital media receiver 150 receives programming, in the form of VOD normal play stream 170N, from VOD server 130-1. Next, as shown in FIG. 6B, VOD server 130-2 receives a stream switchover notification 610. In some embodiments, notification 610 originates from VOD server 130-1, while in other embodiments notification 610 originates from a component (not shown) which manages stream distribution among a set of VOD servers. VOD server 130-1 stops delivering VOD normal play stream 170N to digital media receiver 150 (as indicated by the "X" over the stream in FIG. 6B). Note that the switchover notification 610 can occur before delivery stops (e.g., as in the case of a coordinated switchover), or after delivery stops (e.g., as in the case of a failover).

Figure 6C:
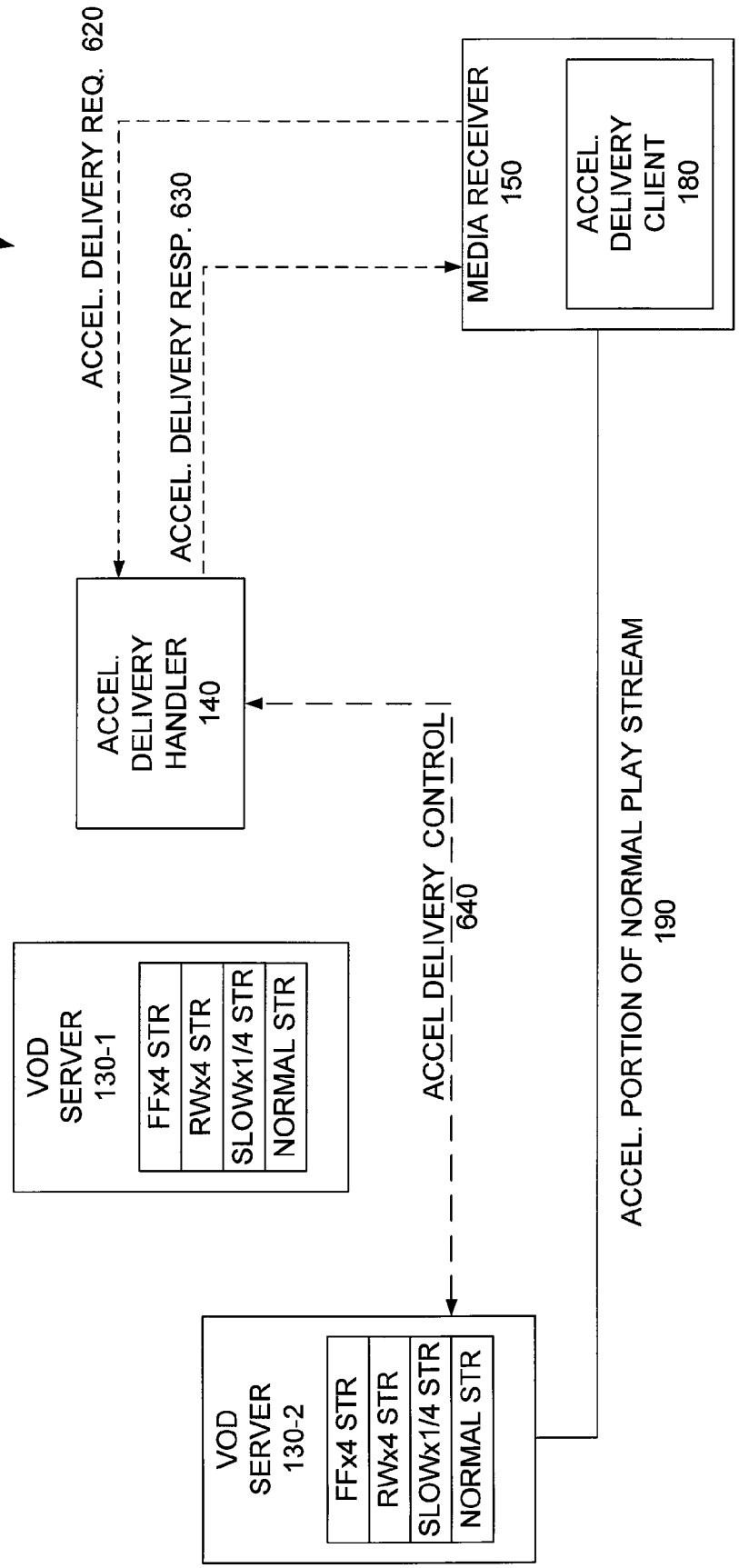
Figure 6D:
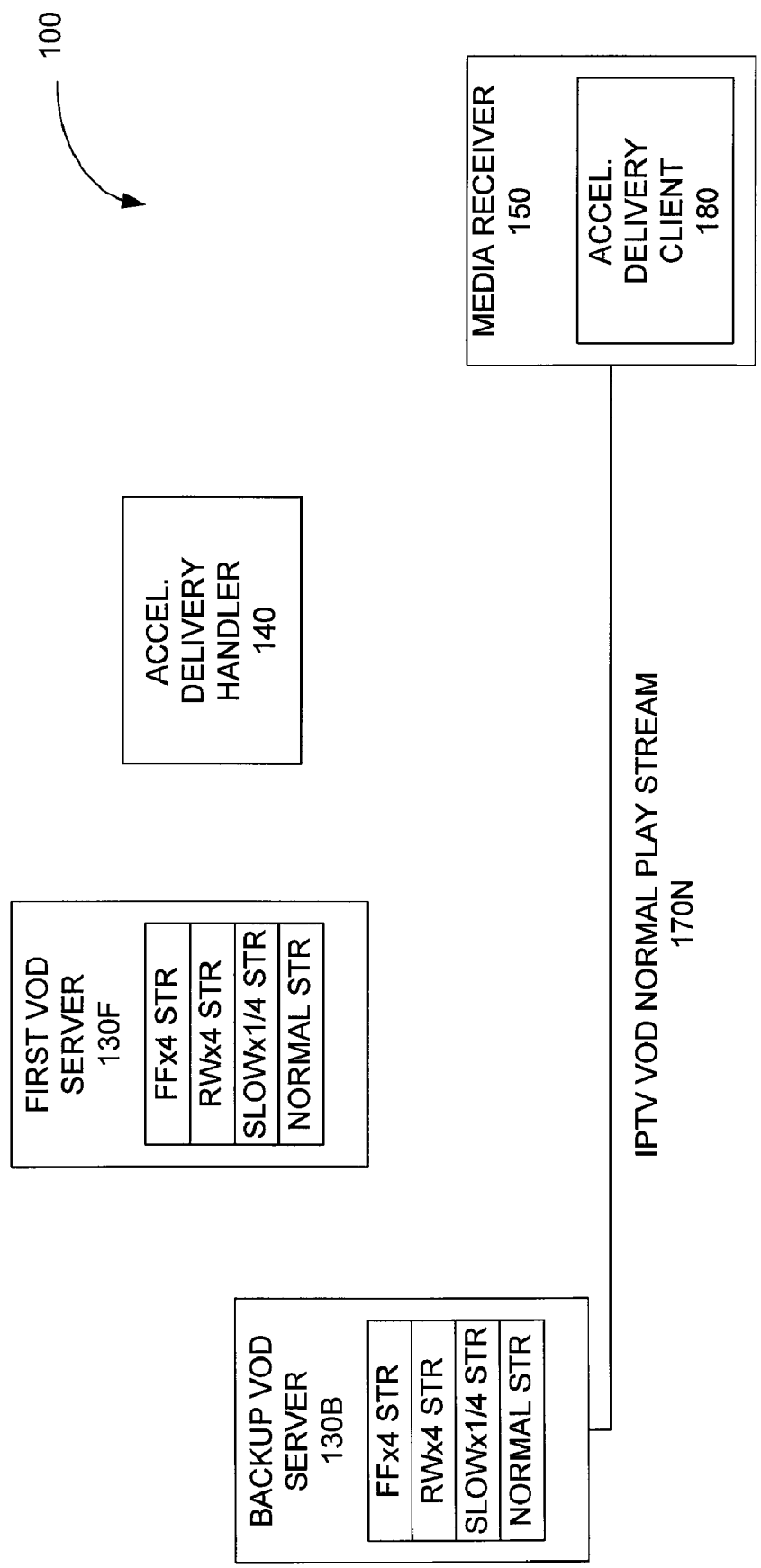

Frame buffers in accelerated delivery client 180 are depleted when delivery stops. Therefore, as shown in FIG. 6C, accelerated delivery client 180 sends an accelerated delivery request 620 to accelerated delivery handler 140. In response to 620, accelerated delivery handler 140 decides (in this example) to grant the request, and sends a positive response 630 including a granted burst size. Accelerated delivery handler 140 also instructs (640) VOD server 130-2 to produce and deliver the interrupted stream at an accelerated rate. VOD server 130-2 generates and delivers the same content at a faster rate, as accelerated portion 190. When the accelerated delivery is finished, VOD server 130-2 delivers the same content at a normal rate, as shown in FIG. 6D.

FIG. 7 is a hardware block diagram of one embodiment of accelerated delivery handler 140. Accelerated delivery handler 140 contains a number of components that are well known in the computer arts, including a processor 710, a network interface 720, memory 730, and a storage device 740 (e.g., non-volatile memory or a disk drive). These components are coupled via a bus 750. Omitted from FIG. 7 are a number of conventional components that are unnecessary to explain the operation of accelerated delivery handler 140.

As shown in FIG. 7, accelerated delivery handler logic 760 may be implemented in hardware, or may reside in memory 730 as instructions which, when executed by processor 710, implement systems and methods of reducing media stream delay. Hardware implementations include, but are not limited to, a programmable logic device (PLD), programmable gate array (PGA), field programmable gate array (FPGA), an application-specific integrated circuit (ASIC), a system on chip (SoC), and a system in package (SiP). Furthermore, accelerated delivery handler logic 760 may be implemented as a combination of processor-executable software and hardware logic.

Figure 8:
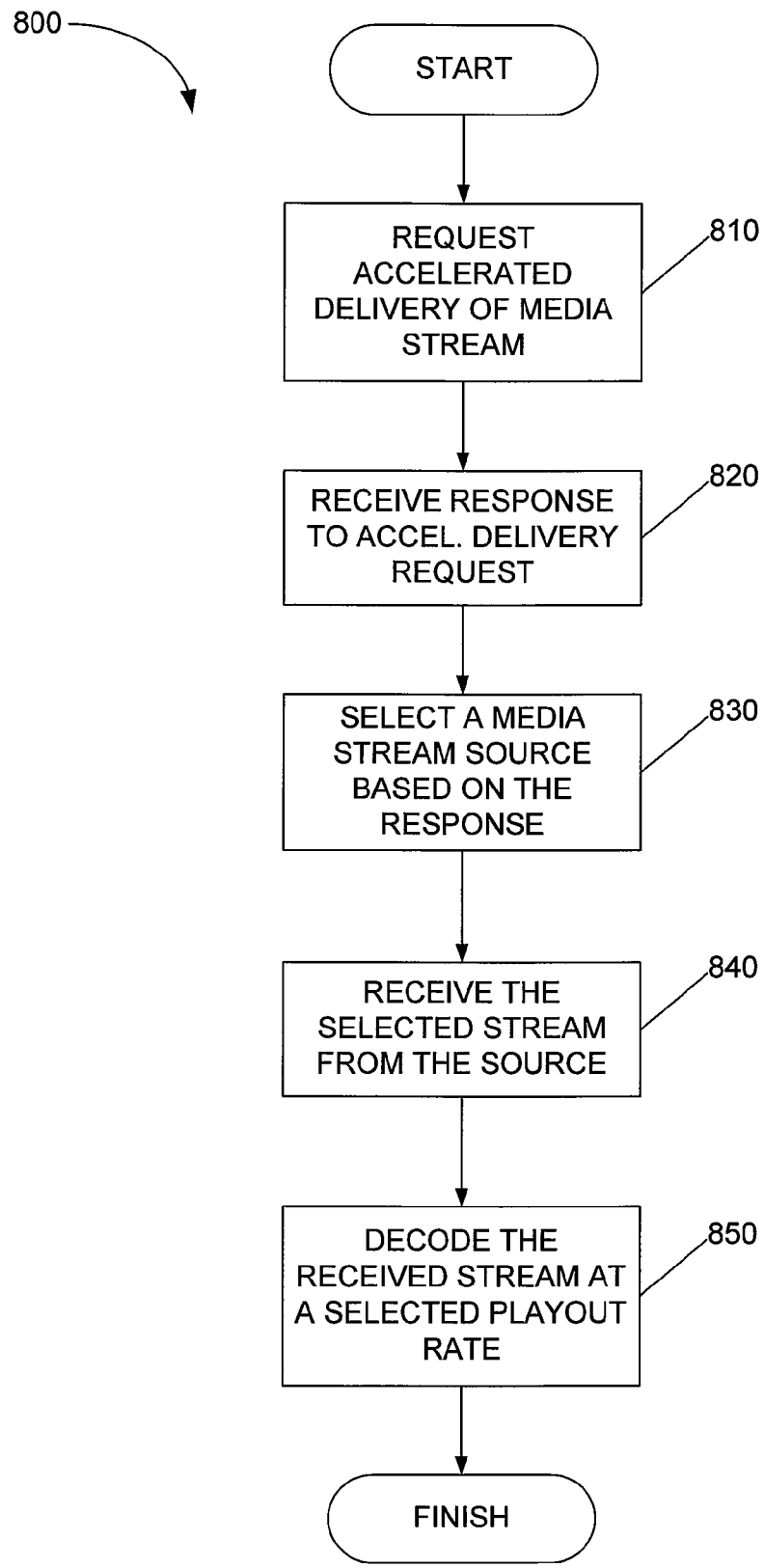
FIG. 8 is a flowchart illustrating operation of the accelerated delivery client from FIG. 1, in some embodiments of systems and methods of reducing media stream delay.

FIG. 8 is a flowchart which illustrates operation of accelerated delivery client 180 in some embodiments of systems and methods of reducing media stream delay. Process 800 begins at block 810, where accelerated delivery client 180 requests accelerated delivery of a specified media stream. At block 820, a response to the request is received. At block 830, client 180 selects a source media stream source for playout, based on information in the accelerated delivery response. Examples of appropriate sources used by various embodiments include a different IP stream types (e.g., unicast or multicast) and different components (channel change server, a VOD server, another media content server, etc.), as described earlier in connection with the flow chart of FIGS. 3A-D and the sequence diagrams of FIGS. 4A-C, FIGS. 5A-C, and FIGS. 6A-D. At block 840, the media stream from the selected source is received into a decoder buffer. At block 850, the stream is decoded from the buffer at a selected playout rate. Process 800 is then complete.

Figure 9:
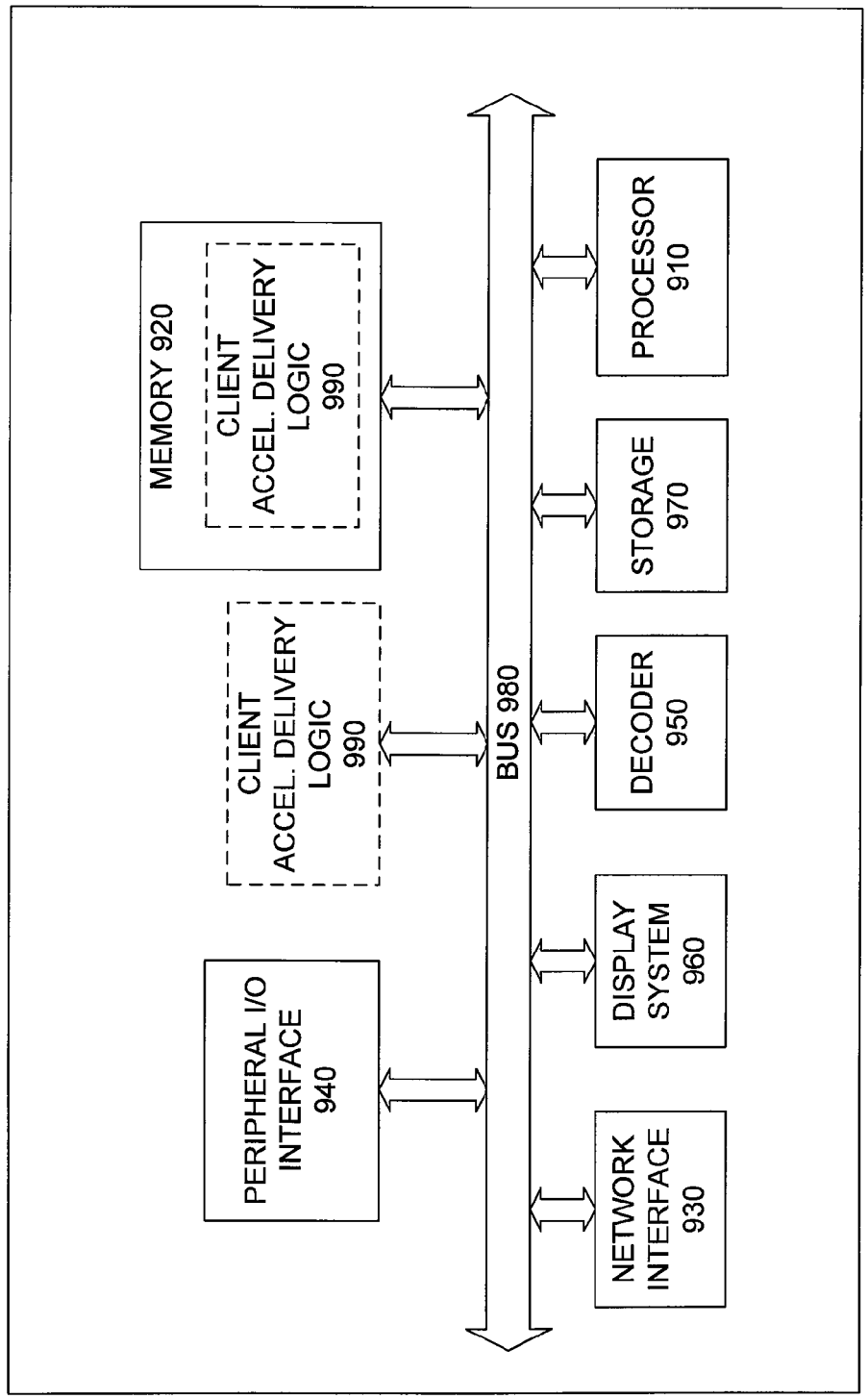
FIG. 9 is a hardware block diagram of one embodiment of the accelerated delivery client from FIG. 1.

FIG. 9 is a hardware block diagram of one embodiment of digital media receiver 150. Digital media receiver 150 contains a number of components that are well known in the computer arts, including a processor 910, memory 920, a network interface 930, a peripheral input output (I/O) interface 940, a decoder 950, and a display system 960. Some embodiments also include a storage device 970 (e.g., non-volatile memory or a disk drive). These components are coupled via a bus 980. Omitted from FIG. 9 are a number of conventional components that are unnecessary to explain the operation of digital media receiver 150.

Peripheral I/O interface 940 provides input and output signals, for example, user inputs from a remote control or front panel buttons or a keyboard, and outputs such as LEDs or LCD on the front panel. Network interface 930 receives streams. Decoder 950 decodes an incoming video stream into a stream of decoded video frames. In some embodiments, decoder 950 also performs demultiplexing of multiple streams (e.g., audio and video). In some embodiments, decoder 950 also decrypts the encoded stream. Display system 960 converts the decoded video frames into a video signal for display by a computer monitor or a television.

As described above, digital media receiver 150 receives digital video streams via network interface 930. In some embodiments, this is a local area network (LAN) interface or a wide area network (WAN) interface such as the Internet. In other embodiments, network interface 930 interfaces to a radio frequency (RF) network, and so may include a tuner/demodulator (not shown) which processes digital signals received over the RF network.

As shown in FIG. 9, accelerated delivery client logic 990 may be implemented in hardware, or may reside in memory 920 as instructions which, when executed by processor 910, implement systems and methods of reducing media stream delay. Hardware implementations include, but are not limited to, a programmable logic device (PLD), programmable gate array (PGA), field programmable gate array (FPGA), an application-specific integrated circuit (ASIC), a system on chip (SoC), and a system in package (SiP). Furthermore, accelerated delivery client 180 may be implemented as a combination of processor-executable software and hardware logic.

Accelerated delivery handler 140 and accelerated delivery client 180 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The software components illustrated herein are abstractions chosen to illustrate how functionality is partitioned among components in some embodiments of accelerated delivery handler 140 and accelerated delivery client 180 disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay, according to embodiments disclosed herein. Alternatively, these diagrams may be viewed as depicting actions of an example of a method implemented by logic for systems and methods of reducing media stream delay. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
    receiving a request for accelerated delivery of a specified media stream, the request including a requested burst size;
    deciding to grant or deny the accelerated delivery request based on a group of factors including resource usage, current network congestion, or a combination thereof; and
    responding to the accelerated delivery request with a response indicating the decision to grant or deny, wherein if the decision is to grant, the response comprises the size of a granted burst wherein the size of the granted burst is different than the requested burst size.

2. The method of claim 1, further comprising:
    responsive to a decision to grant, delivering the specified media stream at a delivery rate faster than a nominal delivery rate of the specified media stream.

3. The method of claim 2, wherein the delivering comprises:
    delivering the specified media stream as a unicast stream.

4. The method of claim 1, further comprising:
    responsive to a decision to grant, coordinating delivery of the specified media stream, the delivery rate being faster than a nominal delivery rate of the specified media stream.

5. The method of claim 1, wherein the deciding comprises:
    evaluating one or more of the factors to determine whether the evaluated factor supports granting the delivery request or denying the delivery request, wherein the decision is based on the evaluation.

6. The method of claim 1, wherein the deciding comprises:
    evaluating one or more of the factors to determine whether the evaluated factor supports granting the delivery request or denying the decision request; and
    assigning a weight to each of the evaluations, wherein the decision is based on the weighted evaluations.

7. A method comprising:
    receiving a request for accelerated delivery of a specified media stream, the request including a requested burst size;
    deciding to grant or deny the accelerated delivery request based at least in part on the requested burst size; and
    responding to the accelerated delivery request with a response indicating the decision to grant or deny and further indicating a granted burst size when the decision is to grant, wherein if the decision is to grant, the response comprises the size of a granted burst wherein the size of the granted burst is different than the requested burst size.

8. The method of claim 7, wherein the deciding is further based on resource usage, current network congestion, or a combination thereof.

9. The method of claim 7, further comprising:
    determining the granted burst size for the accelerated delivery.

10. The method of claim 7, wherein the specified media stream includes a plurality of video frames, the method further comprising:
    selecting, from the plurality of video frames, the intra-coded frame to be the first video frame in the delivered stream, the selecting based on the granted burst size, current resource usage, current network congestion, or a combination thereof; and
    generating the stream such that the selected intra-coded frame appears as the first video frame in the delivered stream.

11. The method of claim 7, further comprising:
    responsive to a decision to grant, delivering the specified media stream at a delivery rate faster than a nominal delivery rate of the specified media stream.

12. The method of claim 11, wherein the delivering comprises:
    delivering the specified media stream as a unicast stream.

13. The method of claim 7, further comprising:
    responsive to a decision to grant, coordinating delivery of the specified media stream, the delivery rate being faster than a nominal delivery rate of the specified media stream.

14. An apparatus comprising:
    memory storing executable instructions thereon; and
    a processor configured by the executable instructions to:
        receive a request for accelerated delivery of a specified media stream, the request including a requested burst size;
        decide to grant or deny the accelerated delivery request based at least in part on the requested burst size; and
        respond to the accelerated delivery request with a response indicating the decision to grant or deny and further indicating a granted burst size when the decision is to grant, wherein if the decision is to grant, the response comprises the size of a granted burst wherein the size of the granted burst is different than the requested burst size.

15. The apparatus of claim 14, wherein the processor is further configured to decide based on resource usage, current network congestion, or a combination thereof.

16. The apparatus of claim 14, wherein the processor is further configured to:
    determine the granted burst size for the accelerated delivery.

17. The apparatus of claim 14, wherein the specified media stream includes a plurality of video frames, wherein the processor is further configured to:

select, from the plurality of video frames, the intra-coded frame to be the first video frame in the delivered stream, the selecting based on the granted burst size, current resource usage, current network congestion, or a combination thereof; and generate the stream such that the selected intra-coded frame appears as the first video frame in the delivered stream.

18. The apparatus of claim 14, wherein the processor is further configured to:

responsive to a decision to grant, deliver the specified media stream at a delivery rate faster than a nominal delivery rate of the specified media stream.

19. The apparatus of claim 18, wherein the processor is further configured to deliver the specified media stream as a unicast stream.

20. The apparatus of claim 14, wherein the processor is further configured to:

responsive to a decision to grant, coordinate delivery of the specified media stream, the delivery rate being faster than a nominal delivery rate of the specified media stream.

\* \* \* \* \*